(12) United States Patent
Schmidt et al.

(10) Patent No.: US 11,328,234 B2
(45) Date of Patent: May 10, 2022

(54) INTERACTIVE PROJECT PROGRESS TRACKING INTERFACE

(71) Applicant: SURECLINICAL INC., Rancho Cordova, CA (US)

(72) Inventors: Zachariah Schmidt, Rancho Cordova, CA (US); Piotr Dziewonski, Cracow (PL)

(73) Assignee: SureClinical Inc., Reno, NV (US)

( * ) Notice: Subject to any disclaimer, the term of this patent is extended or adjusted under 35 U.S.C. 154(b) by 0 days.

(21) Appl. No.: 15/376,632

(22) Filed: Dec. 12, 2016

(65) Prior Publication Data

US 2017/0169383 A1 Jun. 15, 2017

Related U.S. Application Data

(60) Provisional application No. 62/266,529, filed on Dec. 11, 2015.

(51) Int. Cl.
*G06Q 10/06* (2012.01)
(52) U.S. Cl.
CPC . *G06Q 10/063114* (2013.01); *G09G 2380/08* (2013.01)
(58) Field of Classification Search
CPC combination set(s) only.
See application file for complete search history.

(56) References Cited

U.S. PATENT DOCUMENTS

| 5,659,616 A | 8/1997 | Sudia |
| 6,292,830 B1 * | 9/2001 | Taylor ............... G06N 5/043 709/224 |
| 7,043,754 B2 | 5/2006 | Arnouse |

(Continued)

FOREIGN PATENT DOCUMENTS

| WO | WO2008/113302 A2 | 9/2008 |
| WO | WO2013/010172 A2 | 1/2013 |

OTHER PUBLICATIONS

Schmidt, Z., Notice of Allowance, U.S. Appl. No. 12/820,045, dated Feb. 26, 2016, 9 pgs.

(Continued)

*Primary Examiner* — Arif Ullah
(74) *Attorney, Agent, or Firm* — Morgan, Lewis & Bockius LLP

(57) ABSTRACT

Computer systems and methods are provided for updating a task component status. A first graphical user interface is displayed. The first graphical user interface includes a first task completion control with indicia of a first time range that corresponds to a first task, where the first task includes a first plurality of task components, indicia that correspond to at least one completed task component of the first plurality of task components, and indicia that correspond to at least one uncompleted task component of the first plurality of task components. A first input is detected, at a location that corresponds to the first task completion control. In response to detecting the first input, at least one operation is performed to change a status of a respective uncompleted task component. The first graphical user interface is updated using the changed status of the respective uncompleted task component.

20 Claims, 32 Drawing Sheets

(56) References Cited

U.S. PATENT DOCUMENTS

| | | | |
|---|---|---|---|
| 7,103,434 B2* | 9/2006 | Chernyak | G06F 30/00 700/98 |
| 7,353,183 B1* | 4/2008 | Musso | G06Q 10/00 705/313 |
| 8,516,562 B2 | 8/2013 | Headley | |
| 8,875,088 B1* | 10/2014 | Holler | G06Q 10/10 717/101 |
| 2001/0027527 A1 | 10/2001 | Khidekel et al. | |
| 2002/0010861 A1 | 1/2002 | Matsuyama et al. | |
| 2002/0035484 A1 | 3/2002 | McCormick | |
| 2003/0070100 A1 | 4/2003 | Winkler | |
| 2003/0135740 A1 | 7/2003 | Talmor et al. | |
| 2004/0117215 A1 | 6/2004 | Marchosky | |
| 2004/0162831 A1 | 8/2004 | Patterson | |
| 2004/0254848 A1 | 12/2004 | Golan et al. | |
| 2005/0138382 A1 | 6/2005 | Hougaard et al. | |
| 2005/0160084 A1* | 7/2005 | Barrett | G06Q 10/06 |
| 2005/0177734 A1 | 8/2005 | Tanimoto et al. | |
| 2005/0193192 A1 | 9/2005 | Sakazaki et al. | |
| 2006/0106757 A1 | 5/2006 | Sakai et al. | |
| 2006/0265731 A1 | 11/2006 | Matsuda | |
| 2007/0136262 A1 | 6/2007 | Dettinger et al. | |
| 2007/0186164 A1 | 8/2007 | Getsch | |
| 2007/0192155 A1* | 8/2007 | Gauger | G06Q 10/103 705/301 |
| 2007/0204164 A1 | 8/2007 | Cattrone et al. | |
| 2007/0255512 A1 | 11/2007 | Delenstarr et al. | |
| 2007/0291996 A1 | 12/2007 | Hoffman et al. | |
| 2008/0017722 A1 | 1/2008 | Snyder et al. | |
| 2008/0059250 A1 | 3/2008 | Joao | |
| 2008/0098232 A1 | 4/2008 | Miyazaki et al. | |
| 2008/0133295 A1 | 6/2008 | Cappel et al. | |
| 2008/0144936 A1 | 6/2008 | Nishikawa | |
| 2008/0174790 A1 | 7/2008 | Noguchi et al. | |
| 2008/0260287 A1 | 10/2008 | Berryman et al. | |
| 2008/0298631 A1 | 12/2008 | Nishida | |
| 2009/0001167 A1 | 1/2009 | Usuba | |
| 2009/0070348 A1 | 3/2009 | Uejo | |
| 2010/0042585 A1 | 2/2010 | Adler | |
| 2010/0088233 A1 | 4/2010 | Tattan et al. | |
| 2010/0114900 A1 | 5/2010 | Anderson | |
| 2010/0318392 A1* | 12/2010 | Cassels | G06Q 10/0631 705/7.12 |
| 2013/0019289 A1 | 1/2013 | Gonser et al. | |
| 2014/0188501 A1* | 7/2014 | Wong | G06Q 10/103 705/2 |

OTHER PUBLICATIONS

Schmidt, Z., Office Action U.S. Appl. No. 12/820,045, dated Sep. 28, 2015, 20 pgs.

Schmidt, Z., Office Action U.S. Appl. No. 12/820,045, dated May 7, 2015, 21 pgs.

Schmidt, Z,, Office Action U.S. Appl. No. 12/820,045, dated Sep. 10, 2014, 20 pgs.

Schmidt, Z., Final Office Action U.S. Appl. No. 12/820,045, dated May 28, 2014, 19 pgs.

Schmidt, Z., Office Action U.S. Appl. No. 12/820,045, dated Oct. 20, 2013, 19 pgs.

Schmidt, Z., Final Office Action U.S. Appl. No. 12/820,045, dated Feb. 11, 2013, 23 pgs.

Schmidt, Z., Office Action U.S. Appl. No. 12/820,045, dated Oct. 25, 2012, 18 pgs.

Schmidt, Z., Office Action U.S. Appl. No. 16/820,492, dated May 22, 2020, 15 pgs.

Schmidt, Z., Final Office Action U.S. Appl. No. 16/820,492, dated Oct. 6, 2020, 7 pgs.

Schmidt, Z., Notice of Allowance, U.S. Appl. No. 16/820,492, dated Jan. 6, 2021, 10 pgs.

Sureclinical, International Search Report, PCTUS2014/06913, dated Mar. 30, 2015, 15 pgs.

Sureclinical, International Preliminary Report on Patentability, PCTUS2014/069138, dated Jun. 14, 2016, 12 pgs.

Schmidt, Z., Office Action, U.S. Appl. No. 16/632,248, dated Aug. 18, 2021, 8 pgs.

Schmidt, Z., Notice of Allowance, U.S. Appl. No. 16/632,248, dated Dec. 16, 2021, 9 pgs.

* cited by examiner

3000 ⤵

3002
Display, on a display of an electronic device, a first graphical user interface that includes a first task completion control that includes:

3002a
indicia of a first time range that corresponds to a first task, wherein the first task includes a first plurality of task components;

3002b
indicia that correspond to at least one completed task component of the first plurality of task components, and

3002c
indicia that correspond to at least one uncompleted task component of the first plurality of task components

---

3004
The first graphical user interface includes a second task completion control that includes indicia of a second time range that corresponds to a second task, wherein the second task includes a second plurality of task components that is distinct from the first plurality of task components

---

3006
The first task completion control includes indicia of a projected rate of progress of the first task

3008
A first user is associated with the first task; and
the projected rate of progress of the first task is determined using productivity information that corresponds to the first user

---

3010
Detect, at a location that corresponds to the first task completion control, a first input

3012
The first input moves a representation of an object that corresponds to the respective uncompleted task component to the location that corresponds to the first task completion control (A)

3014
In response to detecting the first input, perform at least one operation to change a status of a respective uncompleted task component of the first plurality of task components

3016
The at least one operation to change the status of the respective uncompleted task component of the first plurality of task components includes displaying a second graphical user interface that includes a control for identifying an uncompleted task components

3018
Detecting a second input at a location that corresponds to the control for identifying the uncompleted task component; and
in response to detecting the second input at the location that corresponds to the control for identifying the uncompleted task component, displaying a third graphical user interface that includes a control for selecting an object that corresponds to the identified uncompleted task component

3020
Detecting input at the control for selecting the object that corresponds to the identified uncompleted task component; and
in response to detecting the input at the control for selecting the object that corresponds to the identified uncompleted task component, adjusting a status of the identified uncompleted task component from an uncompleted status to an intermediate-state status

3022
The second graphical user interface includes a control for adjusting a status of an intermediate-state task component from an intermediate-state status to a completed status

3026
Update the first graphical user interface using the changed status of the respective uncompleted task component

3028
Updating the first graphical user interface using the changed status of the respective uncompleted task component includes altering the indicia that correspond to the at least one uncompleted task component of the first plurality of task components

3030
Altering the indicia that correspond to the at least one uncompleted task component of the first plurality of task components includes at least one of:

3030a
reducing a size of indicia that correspond to the at least one uncompleted task component,

3030b
ceasing to display the indicia that correspond to the at least one uncompleted task component, or

3030c
altering a representation of a rate of task completion

3032
The first task completion control includes indicia that correspond to at least one intermediate-state task component

3034
Updating the first graphical user interface using the changed status of the respective uncompleted task component includes altering the indicia that correspond to the at least one intermediate-state task component of the first plurality of task components

3036
Altering the indicia that correspond to the at least one intermediate-state task component of the first plurality of task components includes increasing a size of the indicia that correspond to the at least one intermediate-state task component

Figure 30C

INTERACTIVE PROJECT PROGRESS TRACKING INTERFACE

RELATED APPLICATIONS

This application is a non-provisional application of and claims priority to U.S. Provisional Patent Application No. 62/266,529, filed Dec. 11, 2015, entitled, "Milestone Tracker UI Gadget," which is hereby incorporated by reference in its entirety.

TECHNICAL FIELD

This application relates generally to project management systems, and more particularly, to systems that display interactive project tracking information.

BACKGROUND

Clinical trials are used to collect safety and efficacy data for pharmaceutical products. Management of clinical trials often entails ensuring that large quantities of documents are collected, reviewed, stored, and tracked, for example, in accordance with government agency requirements. Typically, documents are required from multiple entities that are connected to a clinical trial, such as doctors, trial sponsors, and laboratories. Clinical trials occur over long periods of time, often several years, during which different phases of the trial occur. For each phase, different sets of documents may be required. Accurate monitoring of the collection of required materials is crucial for ensuring that a trial progresses in accordance with allocated time and resources.

SUMMARY

Without limiting the scope of the appended claims, after considering this disclosure, and particularly after considering the section entitled "Detailed Description," one will understand how the aspects of various embodiments are used to update a task component status.

In some embodiments, a method for updating a task component status includes displaying, on a display of an electronic device, a first graphical user interface that includes a first task completion control that includes: indicia of a first time range that corresponds to a first task, where the first task includes a first plurality of task components, indicia that correspond to at least one completed task component of the first plurality of task components, and indicia that correspond to at least one uncompleted task component of the first plurality of task components. The electronic device detects, at a location that corresponds to the first task completion control, a first input. In response to detecting the first input, the device performs at least one operation to change a status of a respective uncompleted task component of the first plurality of task components. The device updates the first graphical user interface using the changed status of the respective uncompleted task component.

In some embodiments, a system for updating a task component includes one or more processors, memory, and one or more programs. The one or more programs are stored in the memory and configured to be executed by the one or more processors. The one or more programs include instructions for displaying, on a display of an electronic device, a first graphical user interface that includes a first task completion control that includes: indicia of a first time range that corresponds to a first task, where the first task includes a first plurality of task components, indicia that correspond to at least one completed task component of the first plurality of task components, and indicia that correspond to at least one uncompleted task component of the first plurality of task components. The one or more programs also include instructions for detecting, at a location that corresponds to the first task completion control, a first input. The one or more programs additionally include instructions for performing at least one operation to change a status of a respective uncompleted task component of the first plurality of task components in response to detecting the first input. The one or more programs further include instructions for updating the first graphical user interface using the changed status of the respective uncompleted task component.

In some embodiments, a computer readable storage medium stores one or more programs. The one or more programs comprise instructions, which when executed, cause a device to display, on a display of an electronic device, a first graphical user interface that includes a first task completion control that includes: indicia of a first time range that corresponds to a first task, where the first task includes a first plurality of task components, indicia that correspond to at least one completed task component of the first plurality of task components, and indicia that correspond to at least one uncompleted task component of the first plurality of task components. The one or more programs also comprise instructions that cause a device to detect, at a location that corresponds to the first task completion control, a first input. The one or more programs additionally comprise instructions that cause a device to perform at least one operation to change a status of a respective uncompleted task component of the first plurality of task components in response to detecting the first input. The one or more programs further comprise instructions that cause a device to update the first graphical user interface using the changed status of the respective uncompleted task component.

BRIEF DESCRIPTION OF THE DRAWINGS

So that the present disclosure can be understood in greater detail, a more particular description may be had by reference to the features of various embodiments, some of which are illustrated in the appended drawings. The appended drawings, however, merely illustrate pertinent features of the present disclosure and are therefore not to be considered limiting, for the description may admit to other effective features.

FIGS. 30A-30C are flow diagrams illustrating a method for updating a task component status.

In accordance with common practice, some of the drawings may not depict all of the components of a given system, method or device. Finally, like reference numerals may be used to denote like features throughout the specification and figures.

DETAILED DESCRIPTION

Numerous details are described herein in order to provide a thorough understanding of the example embodiments illustrated in the accompanying drawings. However, some embodiments may be practiced without many of the specific details, and the scope of the claims is only limited by those features and aspects specifically recited in the claims. Furthermore, well-known processes, components, and materials have not been described in exhaustive detail so as not to unnecessarily obscure pertinent aspects of the embodiments described herein.

The interactive project progress tracking interface as described herein displays, in a single interface, information for monitoring project progress and tools for entering project data. The interactive project progress tracking interface allows a user to interact directly with indicia of task progress to enter data related to a task. The indicia of task progress are automatically updated as the user provides the project data. By combining a project progress tracking interface with project content updating tools, the described interface creates a more efficient system for updating and reporting project data, reducing processing requirements in comparison with systems that use separate platforms for project tracking and content management.

Figure 1:
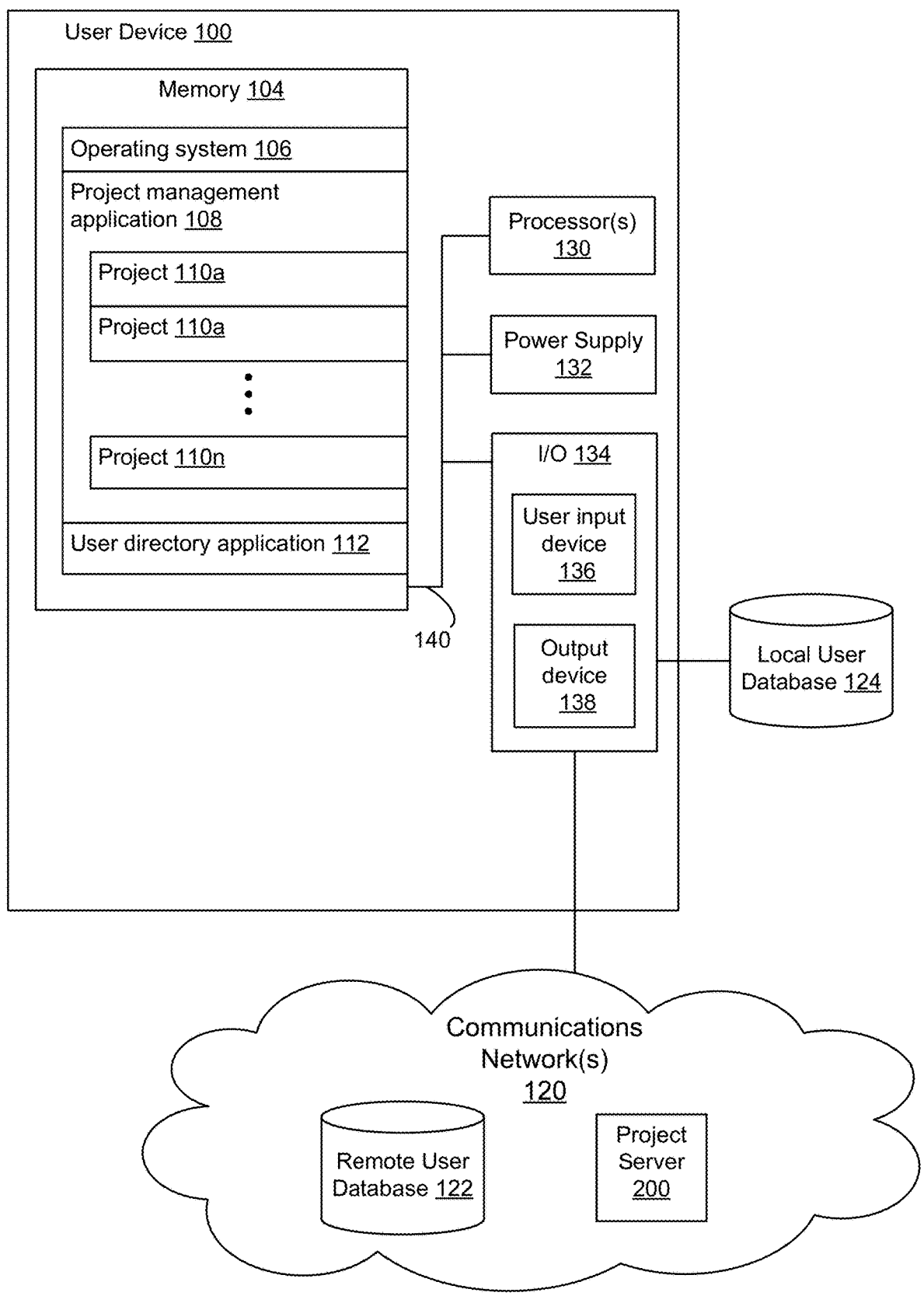
FIG. 1 is a system diagram of a user device, in accordance with some embodiments.

FIG. 1 is a system diagram of user device 100, in accordance with some embodiments. User device 100 typically includes one or more processor(s) 130, a memory 104, a power supply 132, an input/output (I/O) subsystem 134, and a communication bus 140 for interconnecting these components.

Processor(s) 130 execute modules, programs and/or instructions stored in memory 104 and thereby perform processing operations.

Figure 29:
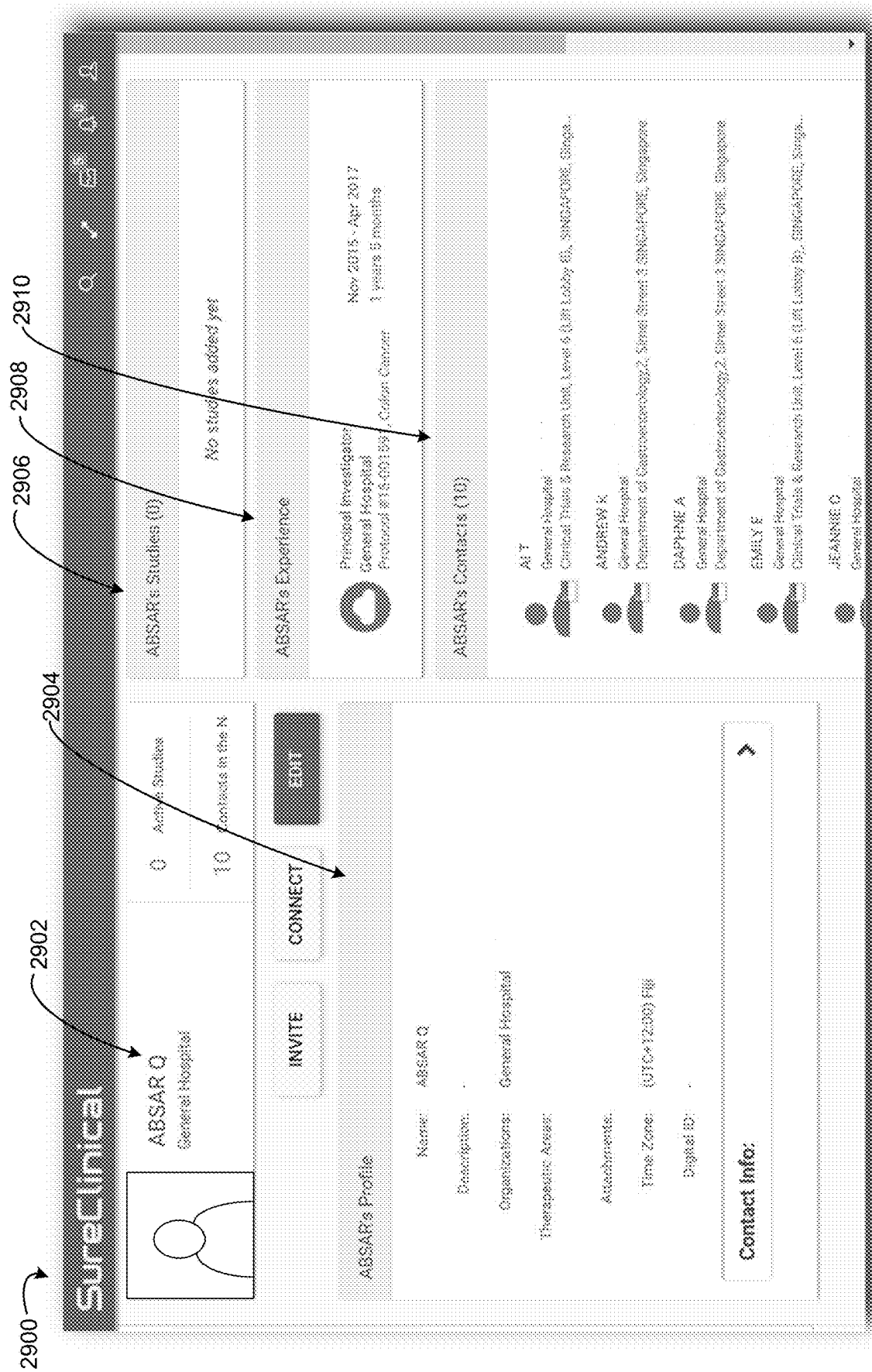
FIG. 29 illustrates a user directory application.

In some embodiments, the memory 104 stores one or more programs (e.g., sets of instructions) and/or data structures, collectively referred to as "modules" herein. In some embodiments, memory 104, or the non-transitory computer readable storage medium of memory 104 stores the following programs, modules, and data structures, or a subset or superset thereof:
  operating system 106;
  project management application 108, which displays graphical user interfaces and performs project operations as described further with regard to FIGS. 4-28 below;
  one or more projects 110 (e.g., project 110a, project 110b, and project 110n) that include information that can be viewed and/or manipulated in project management application 108, as describe further with regard to FIG. 3;

user directory application 112, which displays information about project participants, as describer further with regard to FIG. 29.

The above identified modules (e.g., data structures, and/or programs including sets of instructions) need not be implemented as separate software programs, procedures or modules, and thus various subsets of these modules may be combined or otherwise re-arranged in various embodiments. In some embodiments, memory 104 stores a subset of the modules identified above. In some embodiments, remote user database 122 and/or local user database 124 store one or more modules identified above (e.g., projects 110). Furthermore, the memory 104 may store additional modules not described above. In some embodiments, the modules stored in memory 104, or a non-transitory computer readable storage medium of memory 104, provide instructions for implementing respective operations in the methods described below. In some embodiments, some or all of these modules may be implemented with specialized hardware circuits that subsume part or all of the module functionality. One or more of the above identified elements may be executed by one or more of processor(s) 130. In some embodiments, one or more of the modules described with regard to memory 104 is implemented on memory 204 of server 200 (FIG. 2).

I/O subsystem 134 communicatively couples user device 100 to local devices (e.g., user input device 136, output device 138, local user database 124) and/or remote devices (e.g., devices accessed via a communications network 120 (e.g., the Internet) via a wired and/or wireless connection). In some embodiments, a user input device 136 and/or an output device 138 are integrated with device 100 (e.g., a touchscreen display). In some embodiments, user input device 136 and/or an output device 138 are peripheral devices communicatively connected to user device 100. In some embodiments, a user input device 136 includes a keyboard and/or a pointer device such as a mouse, touchpad, and/or stylus. In some embodiments, output device 138 includes, for example, a display and/or a speaker.

Communication bus 140 optionally includes circuitry (sometimes called a chipset) that interconnects and controls communications between system components.

Figure 2:
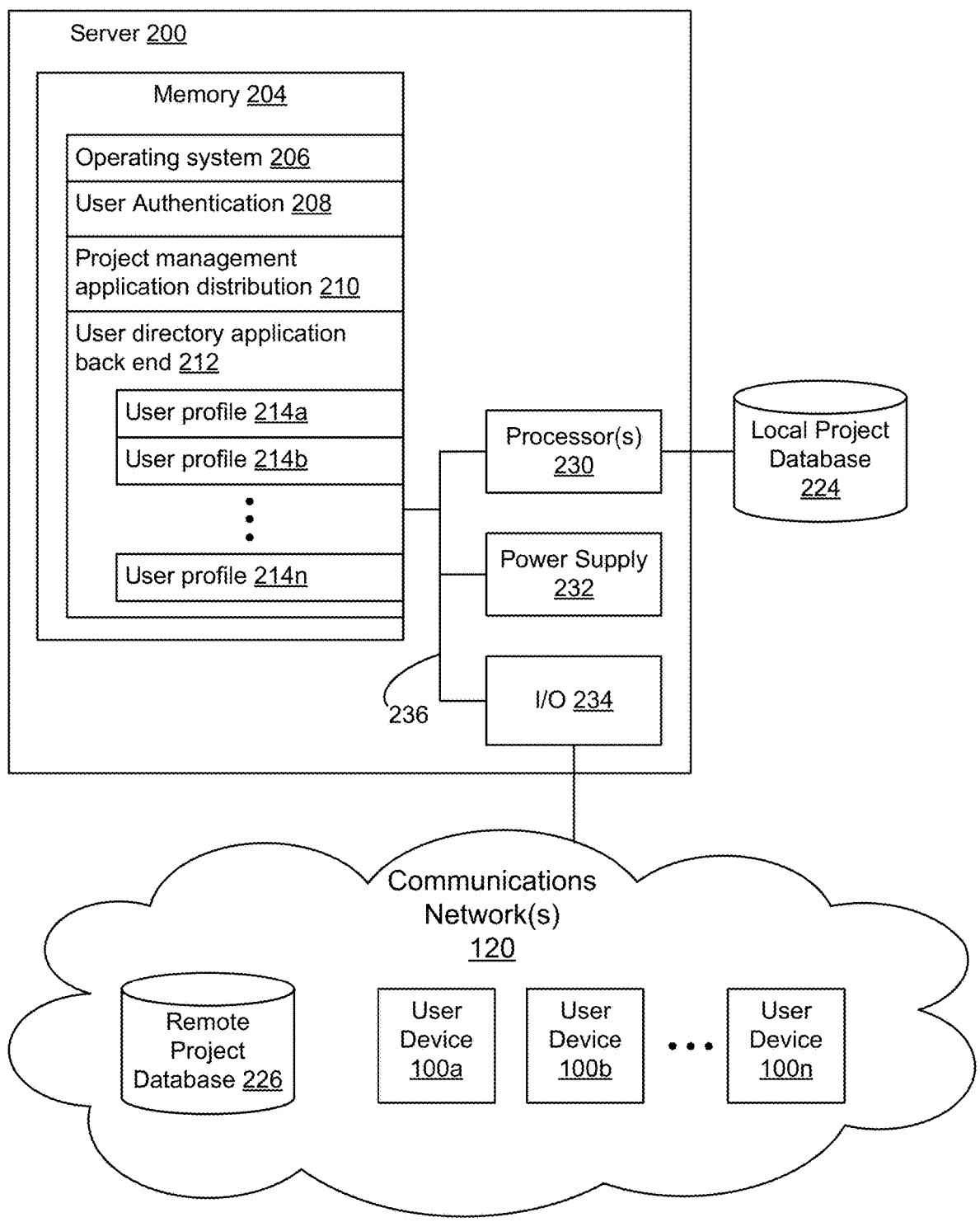
FIG. 2 is a system diagram of a server, in accordance with some embodiments.

FIG. 2 is a system diagram of server 200, in accordance with some embodiments. Server 200 typically includes one or more processor(s) 230, a memory 204, a power supply 232, an input/output (I/O) subsystem 234, and a communication bus 236 for interconnecting these components.

Processor(s) 230 execute modules, programs and/or instructions stored in memory 204 and thereby perform processing operations.

In some embodiments, the memory 204 stores one or more programs (e.g., sets of instructions) and/or data structures, collectively referred to as "modules" herein. In some embodiments, memory 204, or the non-transitory computer readable storage medium of memory 204 stores the following programs, modules, and data structures, or a subset or superset thereof:
  operating system 206;
  user authentication module 208, which receives user authentication information (e.g., identity information, password, cryptographic key, and/or token) from a user device 100 (e.g., user device 100a, user device 100b, and/or user device 100n), performs user authentication using the received information, and transmits authentication confirmation information;
  project management application distribution 210 (for example, server 200 transmits information (e.g., application instructions) for installation of project management application 108 on a user device 100, server 200 transmits information (e.g., application instructions) for execution of project management application 108 within another application (e.g., a web browser application) executing on a user device 100, and/or server 200 stores and/or executes instructions for project management application 108 locally for access by a user device 100);

user directory application back end 212, which stores information about project participants; and one or more user profiles 214 (e.g., user profile 214*a*, user profile 214*b*, and user profile 214*n*) for project participants, as described further with regard to FIG. 29.

The above identified modules (e.g., data structures, and/or programs including sets of instructions) need not be implemented as separate software programs, procedures, or modules, and thus various subsets of these modules may be combined or otherwise re-arranged in various embodiments. In some embodiments, memory 204 stores a subset of the modules identified above. In some embodiments, remote project database 226 and/or local project database 224 stores one or more modules identified above (e.g., user profiles 214). Furthermore, the memory 204 may store additional modules not described above. In some embodiments, the modules stored in memory 204, or a non-transitory computer readable storage medium of memory 204, provide instructions for implementing respective operations in the methods described below. In some embodiments, some or all of these modules may be implemented with specialized hardware circuits that subsume part or all of the module functionality. One or more of the above identified elements may be executed by one or more of processor(s) 230. In some embodiments, one or more of the modules described with regard to memory 204 is implemented on memory 104 of user device 100 (e.g., user authentication is performed by user device 100).

I/O subsystem 234 communicatively couples user device 100 to local devices and/or remote devices via a wired and/or wireless connection.

Communication bus 236 optionally includes circuitry (sometimes called a chipset) that interconnects and controls communications between system components.

Figure 3:
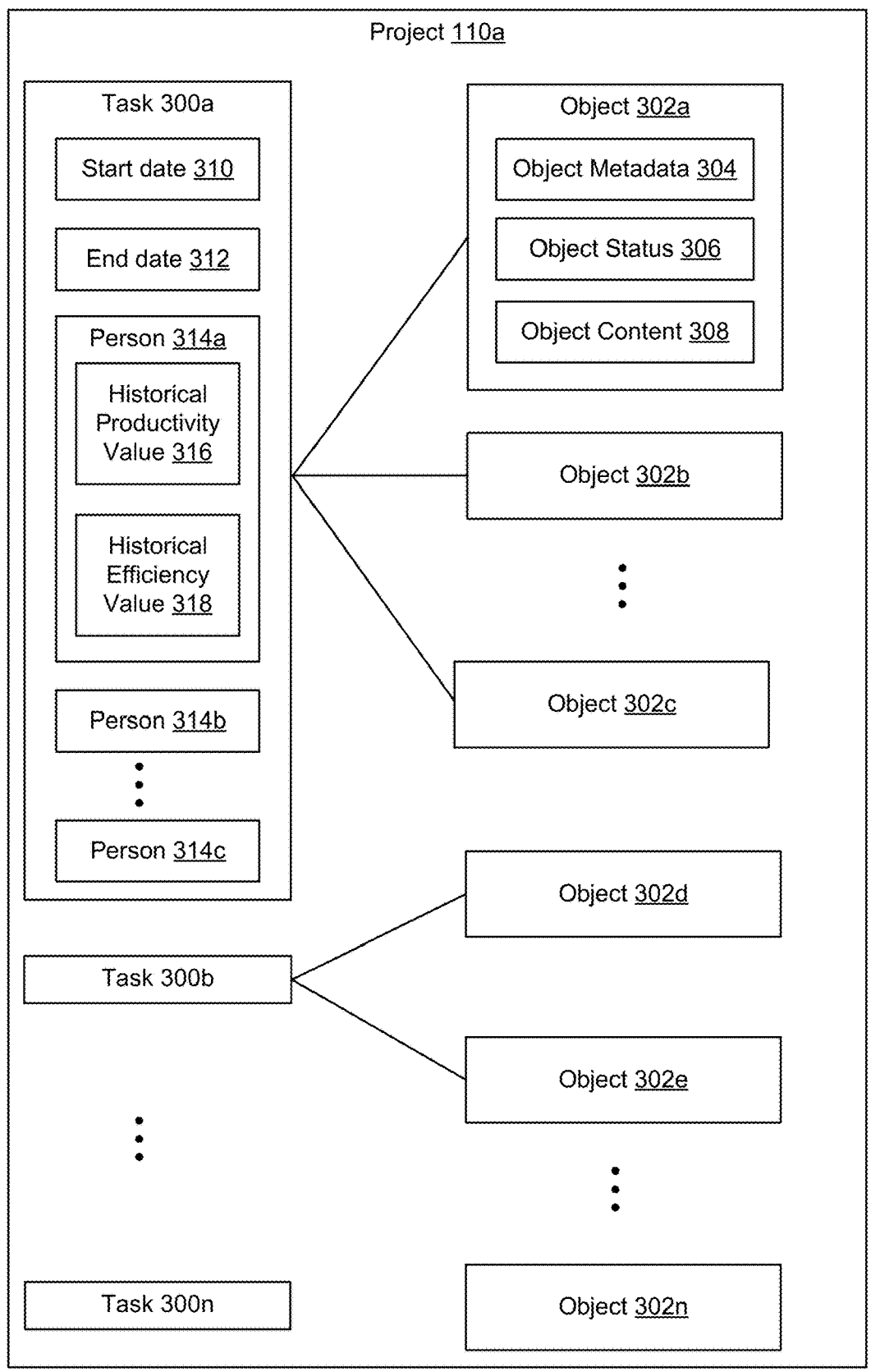
FIG. 3 illustrates a data structure of a project, in accordance with some embodiments.

FIG. 3 illustrates a data structure of project 110, in accordance with some embodiments. In some embodiments, a project 110 (e.g., project 110*a*) is stored in a data storage unit, such as local user database 124, remote user database 122, local project database 224, remote project database 226, memory 104, or memory 204. For example, project 110*a* is stored in a table of a database. In some embodiments, one or more objects 302 (e.g., 302*a*, 302*b*, 302*c*, 302*d*, 302*e*, 302*n*) and/or one or more tasks 300 (e.g., 300*a*, 300*b*, 300*n*) are stored in a data storage unit that stores a project 110*a*. In some embodiments, an association (e.g., a link, such as a relationship in a relational database), is created between one or more objects 302 (e.g., objects 302*a*-302*n*) and a project 110 (e.g., project 110*a*). In some embodiments, an association is created between one or more tasks 302 (e.g., tasks 300*a*, 300*b*, and 300*n*) and a project 110 (e.g., project 110*a*). In some embodiments, an association is created between one or more objects 302 (e.g., object 302*a*-302*c*) and a task 300 (e.g., task 300*a*). In the illustrative example of FIG. 3, tasks 300*a*, 300*b*, and 300*n* have been defined for project 110*a*. Objects 302*a*-302*c* are associated with task 300*a* and objects 302*d*-302*e* are associated with task 300*b*.

An object 302 includes object content 308, such as a content item (e.g., a file, such as a document, image, video, and/or audio), a directory (e.g., a folder that contains one or more content items), an application, a link (e.g., a link to a website, content item, directory, and/or application) and/or a representation of a content item (e.g., document placeholder).

In some embodiments, an object includes object metadata 304 (e.g., document identifier, document type, study ID, content type, organization, person, date, signature, and/or object status that correspond to the object).

In some embodiments, an object 302 includes an object status 306 (e.g., "incomplete," "uploaded and unreviewed," and/or "complete"). In descriptions of object status, the terms "intermediate-state" and "uploaded and unreviewed" are used interchangeably herein. In descriptions of object status, the terms "incomplete" and "uncompleted" are used interchangeably herein. In descriptions of object status, the terms "complete" and "completed" are used interchangeably herein.

In an illustrative example, an object 302*a* includes object content 308 that is a placeholder (e.g., a placeholder that includes identifying information) for a required document. When no document corresponding to object 302*a* has been uploaded, the object status 306 of object 302*a* is "incomplete." When a document corresponding to object 302*a* has been uploaded, object content 308 includes the uploaded document and object status 306 of object 302*a* is "uploaded and unreviewed." In some embodiments, an uploaded document must be reviewed (e.g., by a system administrator). When the document is reviewed, an object status 306 is changed from "uploaded and unreviewed" to "complete."

Task 300 is, for example, a project milestone. In some embodiments, task 300 includes a start date 310 and an end date 312. In some embodiments, start date 310 and/or end date 312 store user input date values. In some embodiments, start date 310 and/or end date 312 store calculated values (e.g., determined based on a current date, a number of objects 302 in a task 300, and/or based on productivity information for one or more people associated with a task.). For example, an end date 312 is calculated as described with regard to FIGS. 24-28. In some embodiments, a user input date value is replaced with a calculated value, or vice versa.

In some embodiments, task 300 includes one more people (e.g., person 314*a*, person 314*b*, person 314*c*) who are responsible for a particular task (e.g., task 300*a*). In some embodiments, a person 314 is a person, a team of people and/or an entity. In some embodiments, a person 314 is associated with a project 110 and/or an object 302 in lieu of or in addition to being associated with a task 300. In some embodiments, task 300 includes a historical productivity value 316 and/or a historical efficiency value 318 for person 314. In some embodiments, a historical productivity value 316 and/or a historical efficiency value 318 for person 314 are retrieved from a user profile 214. A historical efficiency value 316 is, for example, a value indicating an ability of a person 314 to complete task components of tasks 300 on time (e.g., prior to and/or on an end date 312). In some embodiments, a task 300 is complete when all objects 302 of task have object status 306 "complete." A historical productivity value 318 is, for example, a number of objects 302 that a user completes (e.g., when the user performs an action that causes object 302 to change from an "incomplete" object status 306 to a "complete" object status 306) in a defined time frame (e.g., between start date 310 and end date 312) for a task 300.

In some embodiments, a start date 310 and an end date 312 for one or more tasks 300 are automatically generated based on a number of task components (e.g., objects 302) of task 300 and productivity values for one or more users 314 of the task 300.

In an illustrative example, project 110a is a clinical trial for a pharmaceutical product, task 300a corresponds to a first phase of the clinical trial and task 300b corresponds to a second phase of the clinical trial. Objects 302a, 302b, and 302c include placeholders for documents that must be collected during the first phase (e.g., task 300a). When a document corresponding to object 302a is uploaded, object 302a includes the uploaded document as object content 308, and object status 306 is changed from "incomplete" to "updated and unreviewed." When review input has been received for the document corresponding to object 302a, object status 306 is changed from "updated and unreviewed" to "complete."

Figure 4:
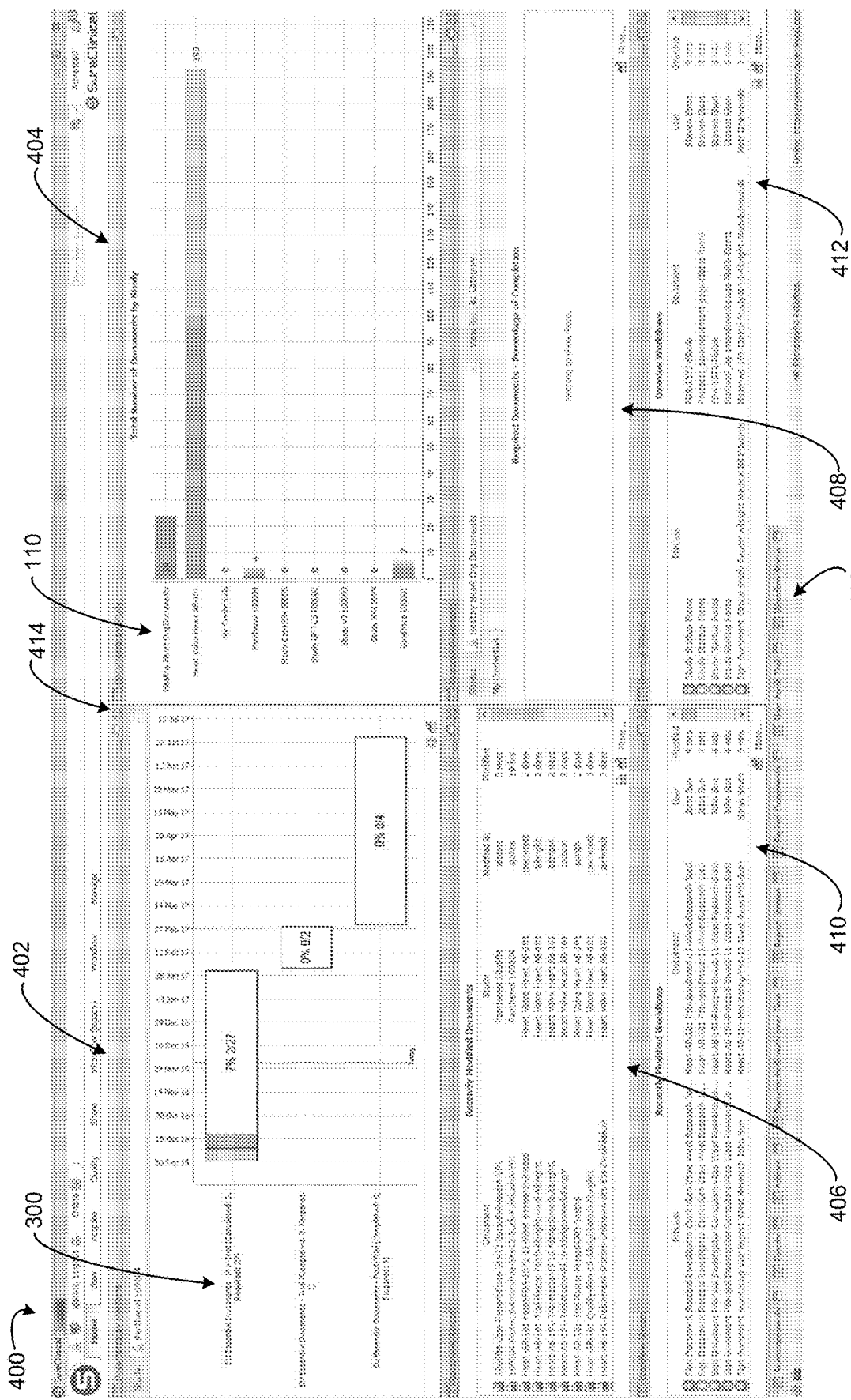
FIG. 4 illustrates a dashboard graphical user interface (GUI) of a project management application, in accordance with some embodiments.

FIG. 4 illustrates a dashboard graphical user interface (GUI) 400 of a project management application 108, in accordance with some embodiments. Dashboard GUI 400 includes one or more project information gadgets, such as task completion interface 402 (e.g., a "Documents by Milestone" gadget, described further with regard to FIG. 5), "Total Number of Documents by Study" gadget 404 (e.g., displaying a chart with information indicating numbers of objects 302 and/or object statuses 306 corresponding to objects 302 of multiple projects 110), "Recently Modified Documents" gadget 406 (e.g., displaying information corresponding to objects 302 for which an object status 306 has recently changed), "Required Documents" gadget 408 (e.g., displaying information corresponding to all objects required for a project), "Recently Modified Workflows" gadget 410 (e.g., displaying information regarding changes to workflow, such as a series of steps associated with completing a task and/or completing an object requirement), and "Overdue Workflow" gadget 412 (e.g., for a task 300a with an end date 312 that is earlier than the current date, displaying information corresponding to objects 302 with an object status 306 that has a value other than "completed"). The gadgets 402-410 displayed in dashboard GUI 400 are user configurable. For example, gadget display manipulation controls 414 allow a user to, for example, expand a gadget, minimize a gadget, and/or detach a gadget from its current displayed location. Additional gadget indicators 416 are controls that, when selected, cause an additional gadget (e.g., "Announcements," "Events," "Articles," "Documents Growth over Time," "Report Stream," "Expired Documents," "User Audit Trail," "Workflow Status") to be displayed in dashboard GUI 400.

Figure 5:
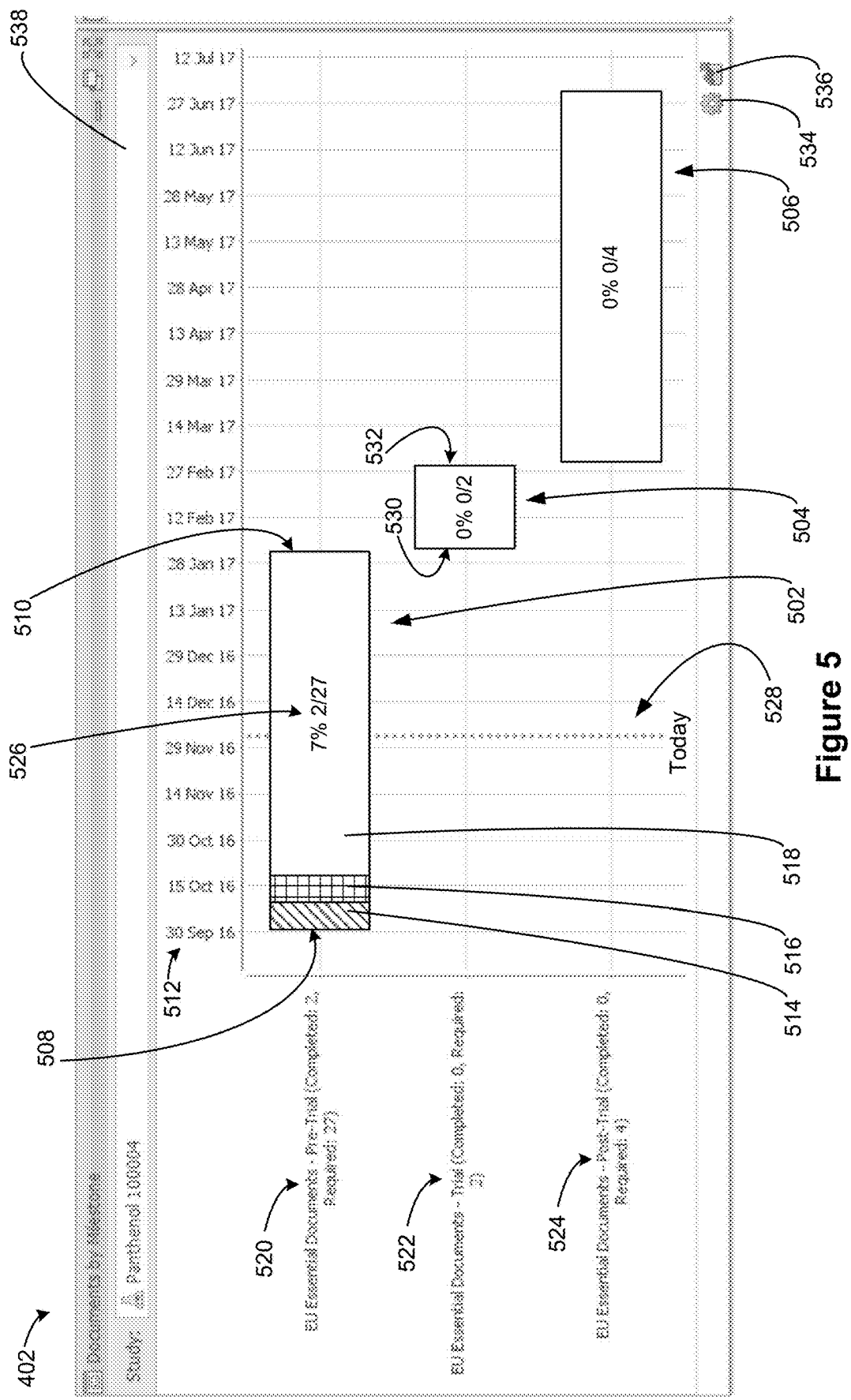
FIG. 5 is an enlarged view of a task completion user interface shown in FIG. 4.

FIG. 5 is an enlarged view of task completion user interface 402 (e.g., "Documents by Milestone" gadget as shown in FIG. 4). Task completion user interface 402 includes task completion controls 502, 504, and 506. Task completion control 502 corresponds to a first task 300 (e.g., task 300a), task completion control 504 corresponds to a second task 300 (e.g., task 300b), and task completion control 506 corresponds to a third task 300 (e.g., task 300n). Task completion user interface 402 includes identifying information 520 for task 300a, identifying information 522 for task 300b, and identifying information 524 for task 300n.

A time range of task completion control 502 is indicated by a distance between the position of a start date 310 (as indicated by the left edge 508 of task completion control 502) and an end date 312 (as indicated by the right edge 510 of task completion control 502), for example, relative to date markers of time axis 512. A time range of task completion control 504 is indicated by a distance between the position of a start date 310 (as indicated by the left edge 530 of task completion control 504) and an end date 312 (as indicated by the right edge 532 of task completion control 504), for example, relative to date markers of time axis 512.

In some embodiments, a task completion control 502 represents a task (e.g., task 300a) that has a number of associated objects 302 (e.g., objects 302a-302c). In the illustrative example of FIG. 5, a number of required objects 302 that correspond to task completion control 502 (and task 302a) is 27, as indicated by task status indicator 526.

Task status indicator 526 indicates that two out of the 27 (i.e., "2/27") required objects 302 for task 302a have an object status 306 of "completed." Task status indicator 526 also indicates that approximately seven percent (i.e., "7%") of the required objects 302 for task 302a have an object status 306 of "completed." A number of objects 302 with an object status 306 of "completed" is indicated by a first region 514 of task completion control 502. For example, a width of first region 514 (e.g., relative to a width of task completion control 502) illustrates a number of objects 302 with an object status 306 of "completed." As shown in FIG. 5, in some embodiments, identifying information 520, 522, and 524 for tasks 302 also includes an indication of a number of required objects 302 that correspond to task completion control 502, a number of objects 302 of a respective task 302 that have an object status 306 of "completed" and/or numbers of objects 302 of the respective task 302 that have object statuses other than "completed." For example, identifying information 520 for task 302a includes the indication "Completed: 2, Required 27."

Task completion control 502 includes a region 516 that indicates a number of objects 302 with an object status 306 of "uploaded and unreviewed" and a region 518 that indicates a number of objects 302 with an object status 306 of "incomplete."

In some embodiments, task completion user interface 402 includes an indication 528 of a current date relative to a time axis 512 (and relative to task completion controls 502, 504 and 506).

In some embodiments, task completion user interface 402 includes a settings control 534 and a report generation control 536. In some embodiments, in response to input detected at a location corresponding to settings control 534, a scheduling interface is displayed. The scheduling interface (not shown) receives user input to add a new task 300, to edit an existing task 300 (e.g., to edit a start date 310 associated with an existing task 300 and/or edit an end date 312 associated with an existing task 300), and/or delete a task 300. In some embodiments, in response to input detected at a location corresponding to report generation control 536, a report generation wizard is displayed. The report generation wizard (not shown) receives user input to define parameters for a report (e.g., to indicate current information about one or more tasks 300 associated with a project 110 and/or information about one or more objects 302 (e.g., object metadata 304, object status 306, and/or object content 308) associated with the one or more tasks 300.

As described further below, because object content 508 can be provided for objects 302 of a task 300 via user interaction with task completion controls 502, 504, and 506, information provided about the status of task completion is current with the operations that have been performed to provide object content. For this reason, reports generated using a report generation wizard (and task progress projections as described with regard to FIGS. 22-28 below) are up to date with the most recent object task completion activities.

Task completion user interface 402 includes a project selection control 538 (e.g., a drop down menu control) for selecting a respective project 110 from a plurality of projects 110 accessible to project management application 108 (e.g., projects 110 stored by user device 100, local user database 124, and/or remote user database 122).

FIGS. 6-11 illustrate a first approach for selecting a document as object content 508 for a selected object 302, in accordance with some embodiments. When the document is selected as object content 508 for the selected object 302, the object status 306 of the selected object changes from "incomplete" to "uploaded and unreviewed."

Figure 6:
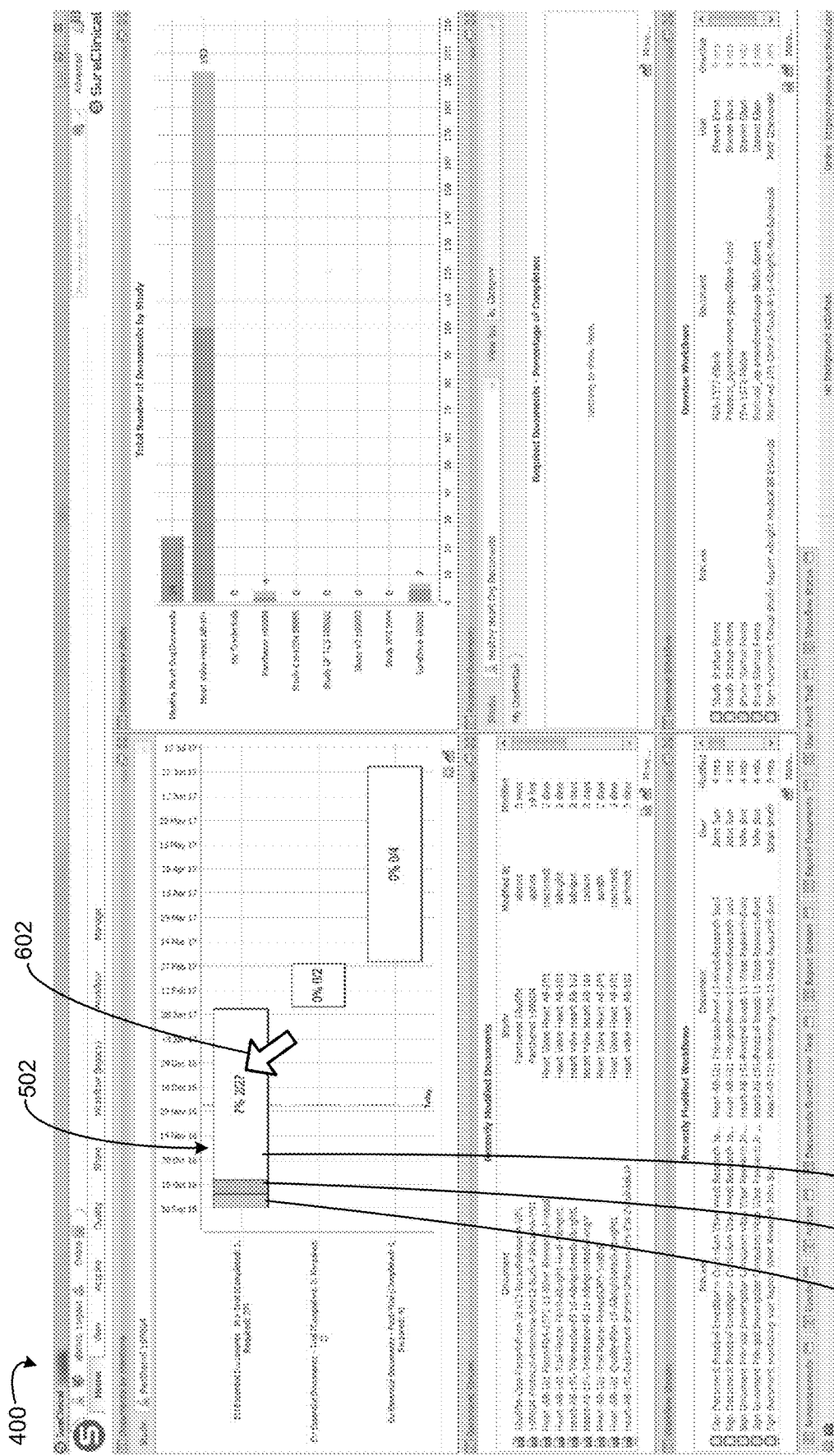
FIGS. 6-11 illustrate a first approach for selecting a document as object content for a selected object.

In FIG. 6, an input by user input device 136 is detected at a location that corresponds to task completion control 502. In some embodiments, an input is a contact detected with a surface of a touchscreen at a location that corresponds to task completion control 502. In some embodiments, an input is detected at a pointer device (e.g., a mouse) while a pointer icon (e.g., arrow 602) is at a location that corresponds to a displayed task completion control 502. In some embodiments, an input received at a location in a user interface as described herein is a primary input (e.g., a left click input) unless described otherwise.

Figure 7:
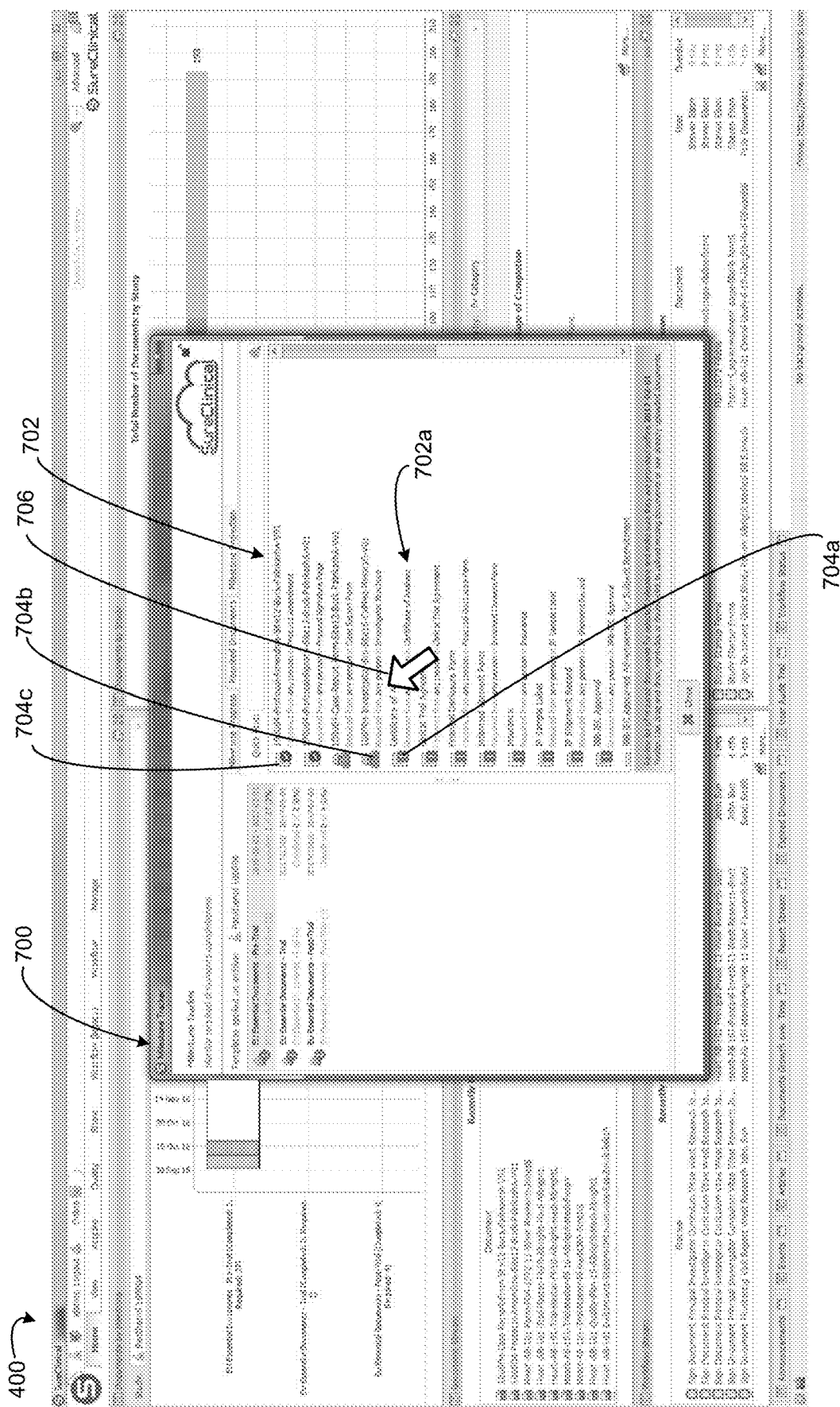

In response to detecting the input, task tracker interface 700 is displayed, as shown in FIG. 7.

In FIG. 7, task tracker interface 700 is displayed (e.g., overlayed over dashboard GUI 400). When task tracker interface 700 is displayed in response to input received at a location that corresponds to task completion control 502, task tracker interface 700 displays object information 702 for a plurality of objects 302 associated with task completion control 502. In some embodiments, information 702 for a respective object 302 (e.g., object 302a) includes an icon 704 that corresponds to an object status 306 of the respective object 302. For example, information 702a corresponding to object 302a includes an icon 704a (e.g., including an exclamation point image) to indicate that object 302a has a current object status 306 of "incomplete." Icon 704b (e.g., including an inbox image) is included in information 702 for a respective object 302 that has an object status of "uploaded and unreviewed." Icon 704c (e.g., including a checkmark image) is included in information 702 for a respective object 302 with an object status 306 of "completed."

An input is detected at a location (e.g., as indicated by pointer icon 706) that corresponds to information 702a corresponding to object 302a. In response to detecting the input, object content upload interface 800 is displayed, as shown in FIG. 8.

Figure 8:
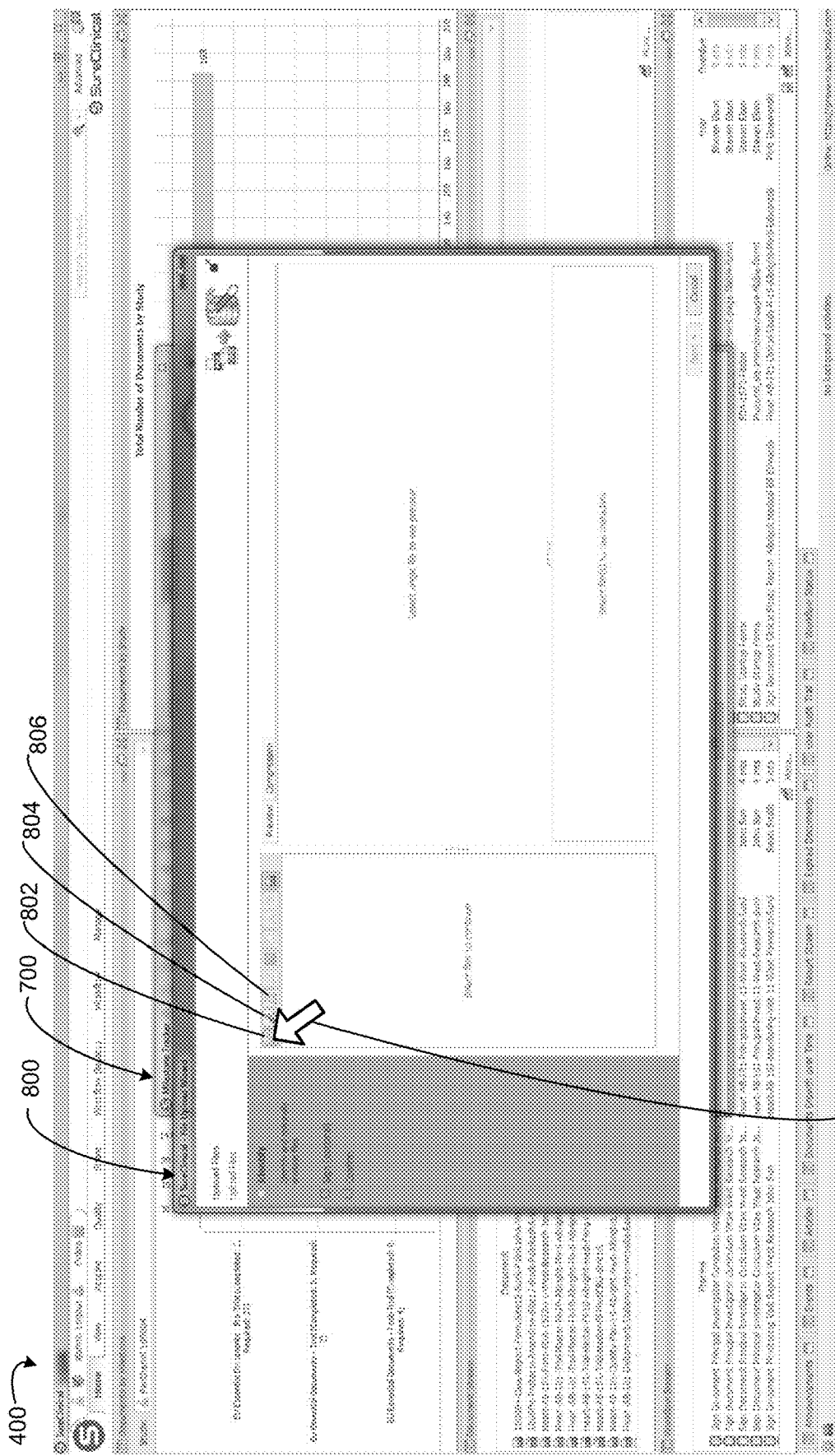

In FIG. 8, object upload interface 800 is displayed (e.g., overlayed over dashboard GUI 400 and/or task tracker interface 700). Object content upload interface 800 includes controls for identifying object content 308 for an object 302, such as a control 802 for displaying a file selection interface 900, a control 804 for displaying a user interface (not shown) to receive input indicating a link (e.g., a uniform resource locator (URL)), and/or a control 806 for displaying a user interface (not shown) for identifying object content 308 from among previously uploaded object content. An input is detected at a location (e.g., as indicated by pointer icon 808) that corresponds to control 802 for displaying file directory interface 900. In response to detecting the input, file selection interface 900 is displayed, as shown in FIG. 9.

Figure 9:
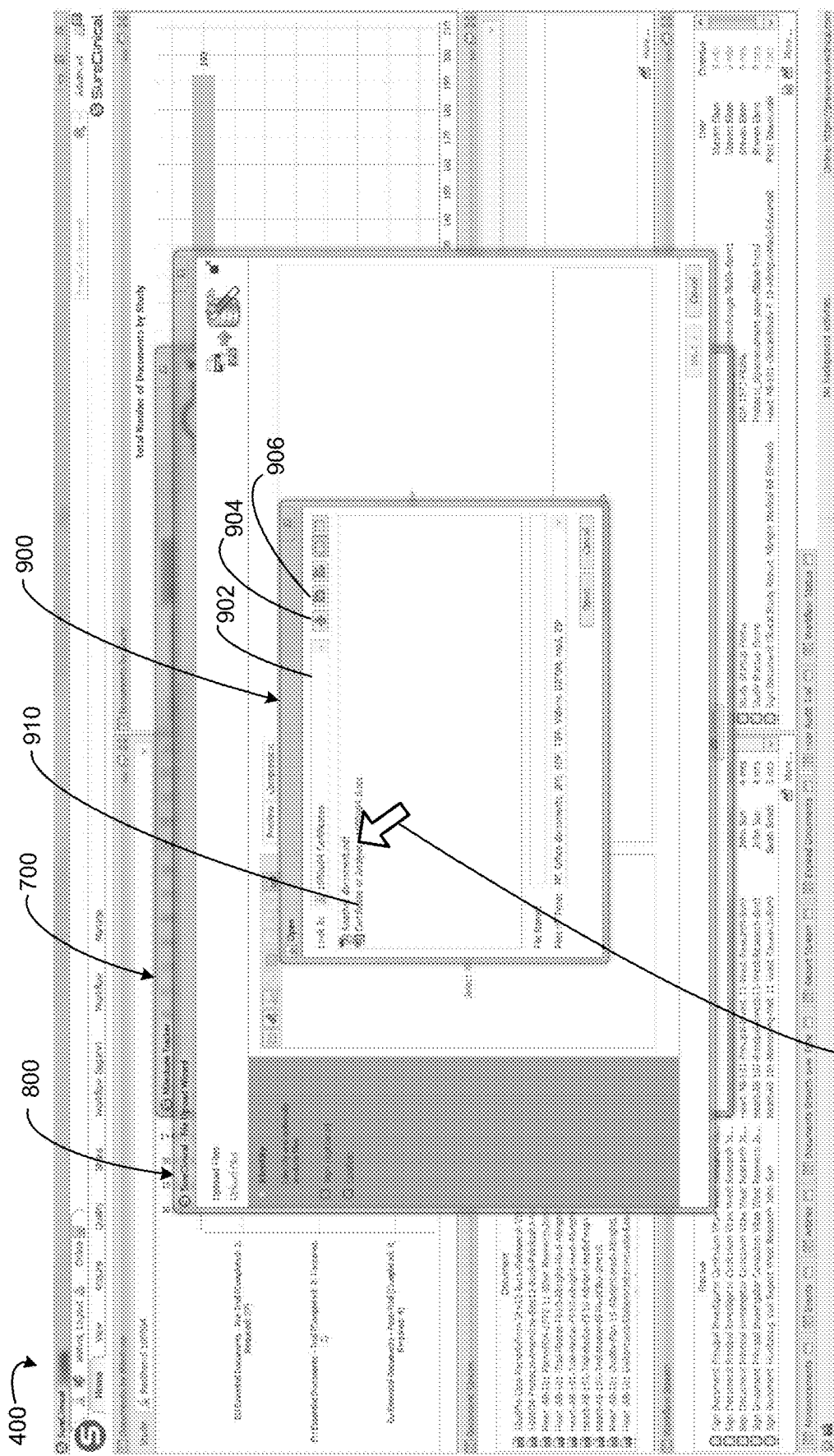
Figure 10:
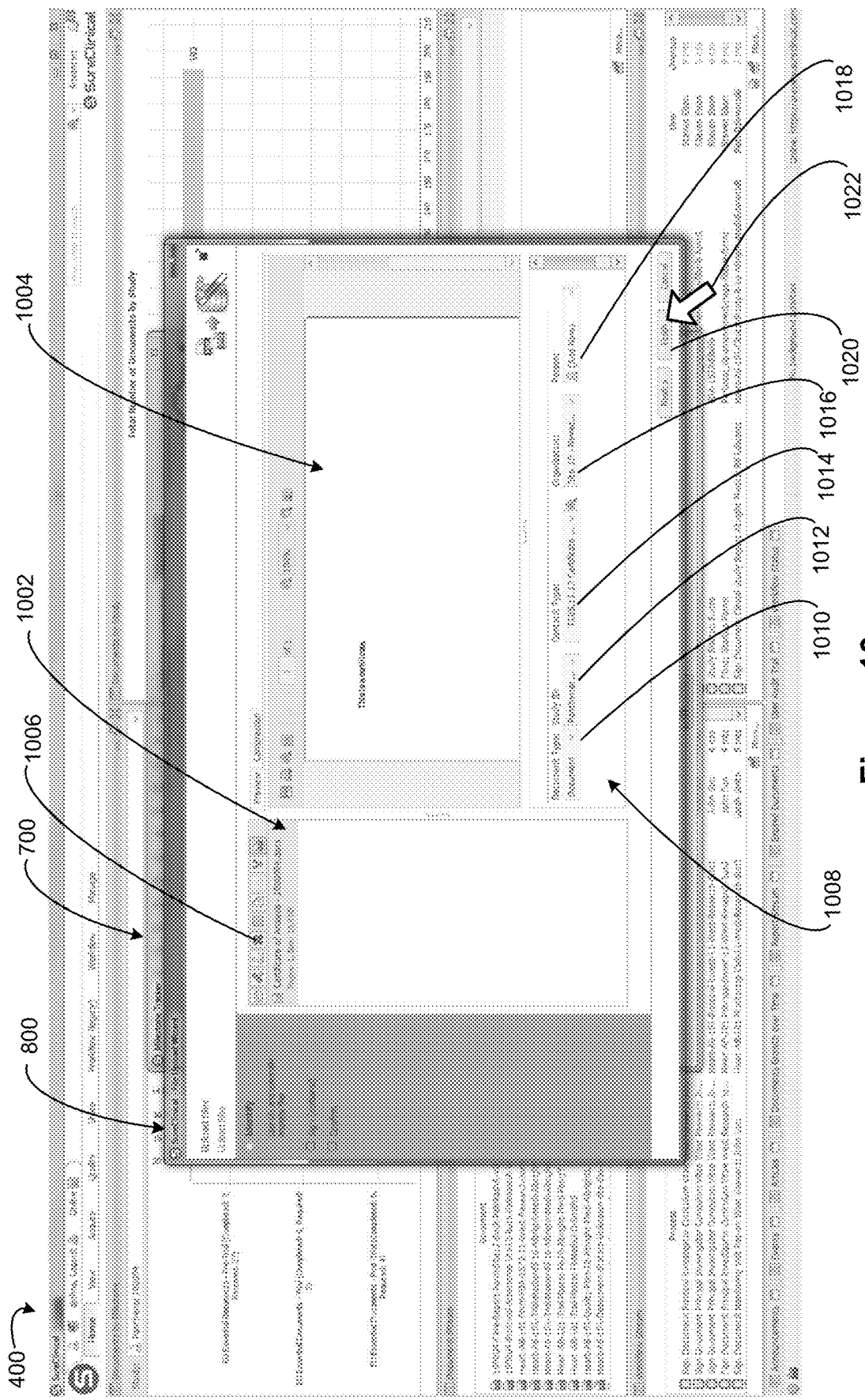

In FIG. 9, file selection interface 900 is displayed (e.g., overlayed over dashboard GUI 400, task tracker interface 700, and/or object upload interface 800). File selection interface 900 includes navigation controls (e.g., a drop down file directory menu control 902, a control 904 for navigating up one level in a directory, and/or a control 906 for navigating to a specific directory location (e.g., a desktop)). File selection interface 900 displays one or more content items (e.g., files, such as document files). An input is detected at a location (e.g., as indicated by pointer icon 908) that corresponds to a representation of a content item 910. In response to detecting the input, file selection user interface 900 ceases to be displayed, revealing underlying object content upload interface 800 (as shown in FIG. 10), and content item 910 is uploaded as object content 208 for the selected object 302a (e.g., the object 302a corresponding to object information 704a). In some embodiments, input provided at file selection user interface 900 is used to select multiple content items as object content 208 for the selected object 302a.

In FIG. 10, object upload interface 800 is displayed (after selection of a content item 910 using file selection user interface 900). Object upload interface 800 displays identifying information for content item 910 in identifying information area 1002. Object upload interface 800 displays a view of content item 910 in a content view region 1004. Displaying the identifying information for content item 910 and the view of content item 910 enables a user to verify that the selected content item 910 is correct content for the selected object 302a. If the selected content item 910 is not the correct content for the selected object 302a, content item deletion control 1006 is provided for deletion of one or more content items selected in object upload interface 800. Object upload interface 800 includes a metadata selection region 1008 with metadata input fields 1010 ("Document Type"), 1012 ("Study ID"), 1014 ("Content Type"), 1016 ("Organization"), and 1018 ("Person"), for designating object metadata 304 for the selected object 302a. In some embodiments, one or more fields are automatically populated based on, for example, information for selected object 302a (e.g., placeholder information), information about a person 314 associated with a task 300 to which object 302a belongs, information about a current user of project management application 108 (e.g., based on user login information), and/or information from content item 910. In some embodiments, metadata fields 1010-1018 include controls to receive user input for designating metadata 304 for selected object 302a.

In some embodiments, information for object metadata 308 is obtained from person information 314 of a task 300 and/or information stored in a user profile 214 (e.g., for a person 314 who is affiliated with a project 110). For example, person field 1012 of object upload interface 800 is populated with information from user profiles 214 of one or more people 314 connected to a project 110 (e.g., as determined from project 110 and/or user profile 214). In some embodiments, person field 1012 of object upload interface 800 is populated with people 314 from a task 300 (e.g., a task 300 that includes the object 302 to which the metadata 308 pertains).

An input is detected at a location (e.g., as indicated by pointer icon 1022) that corresponds to a control 1020 for completing the upload of content item 910 as object content 308 of selected object 302a. In response to detecting the input, the object status 306 of selected object 302a is adjusted from "incomplete" (as indicated by icon 704a in FIG. 7) to "uploaded and unreviewed" (as indicated by icon 704a in FIG. 11) and object upload interface 800 ceases to be displayed, revealing task tracker interface 700 (as shown in FIG. 11).

Figure 11:
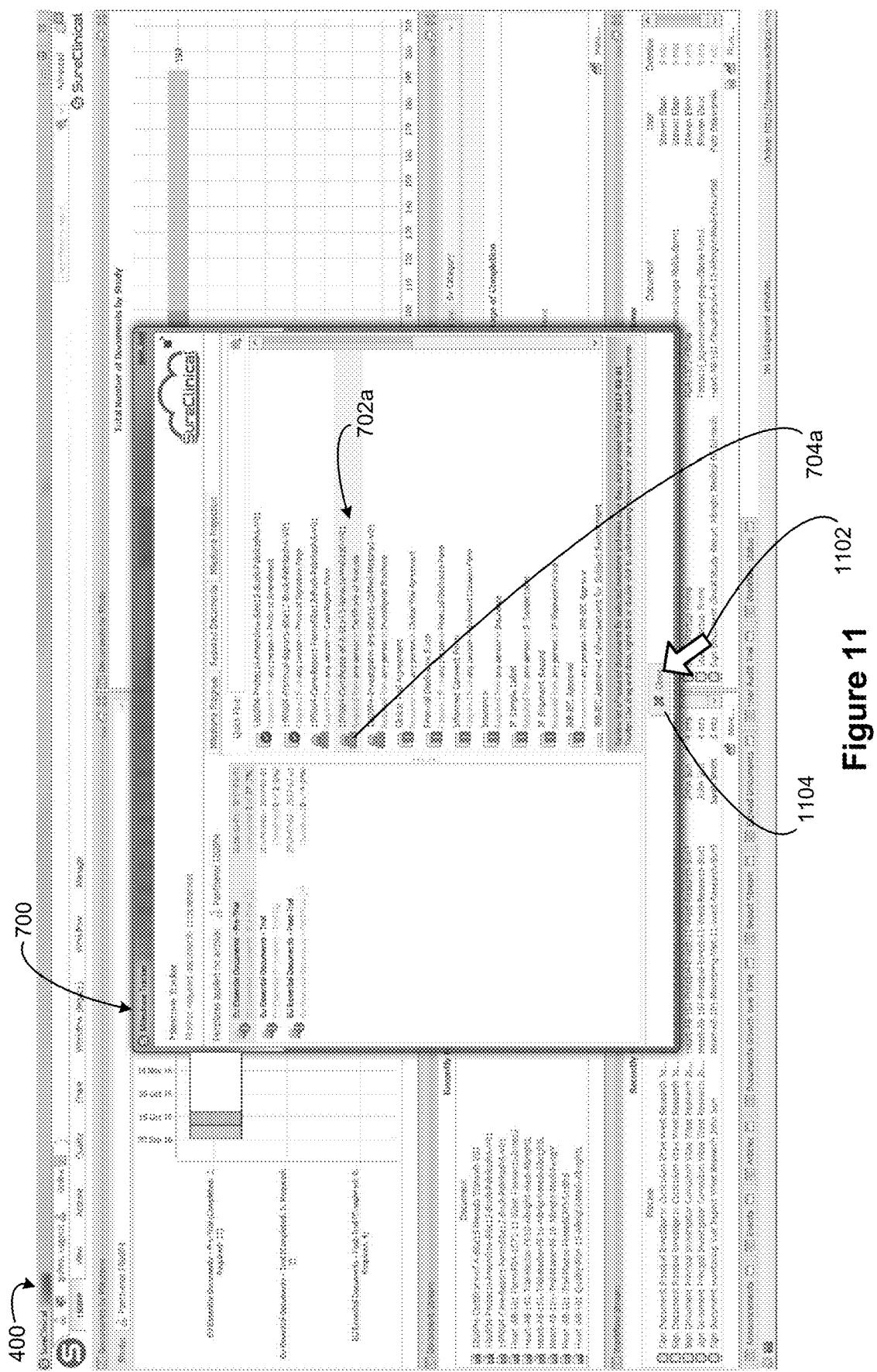

In FIG. 11, task tracker interface 700 is displayed (after completing the upload of content item 910 using object upload interface 800). An input is detected at a location (e.g., as indicated by pointer icon 1102) that corresponds to control 1104 for closing task tracker interface 700. In response to detecting the input, task tracker interface 700 ceases to be displayed, revealing dashboard GUI 400 (as shown in FIG. 12).

Figure 12:
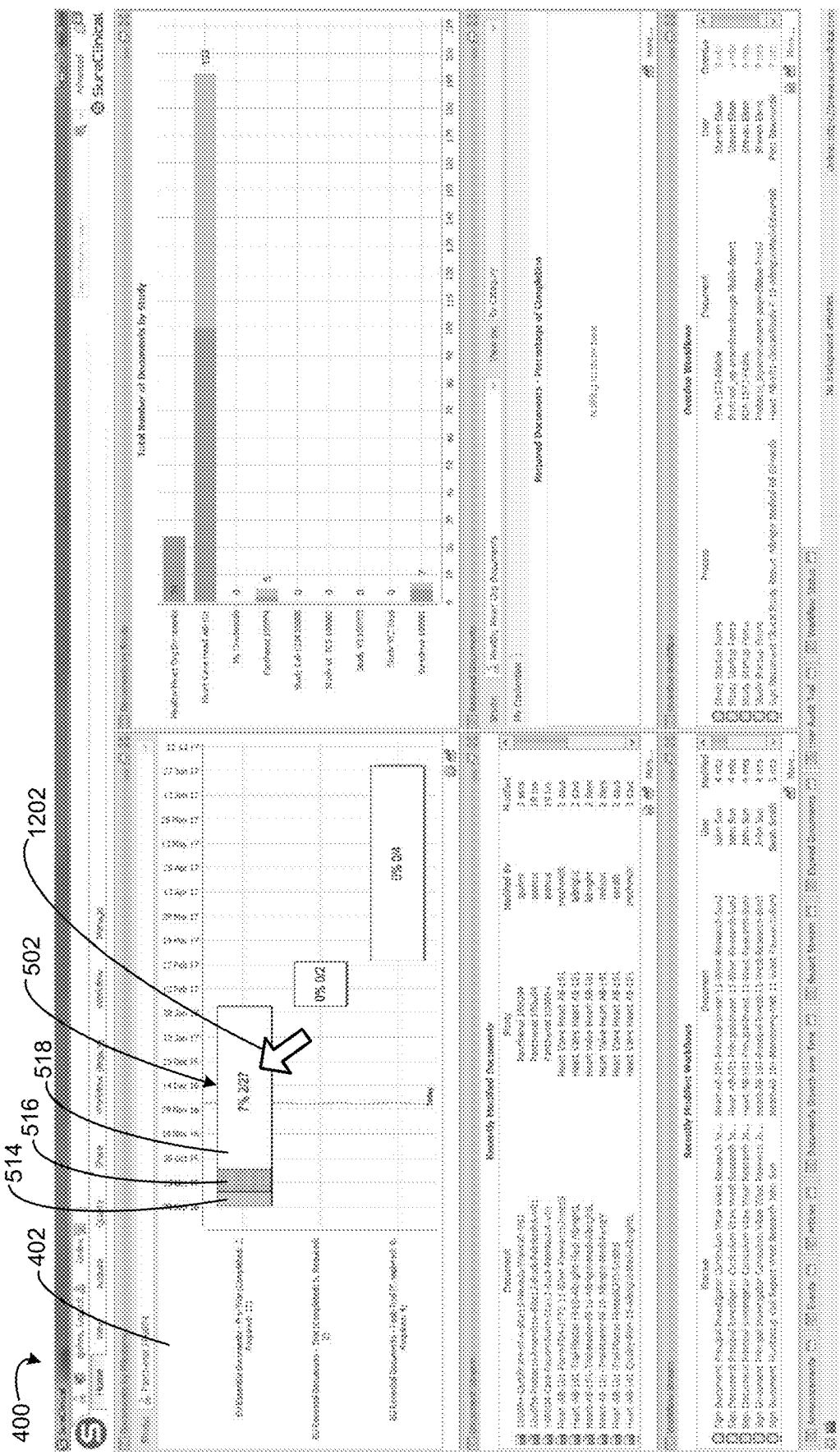
FIGS. 12-14 illustrate user input to change the status of an object from "uploaded and unreviewed" to "completed," in accordance with some embodiments.
Figure 13:
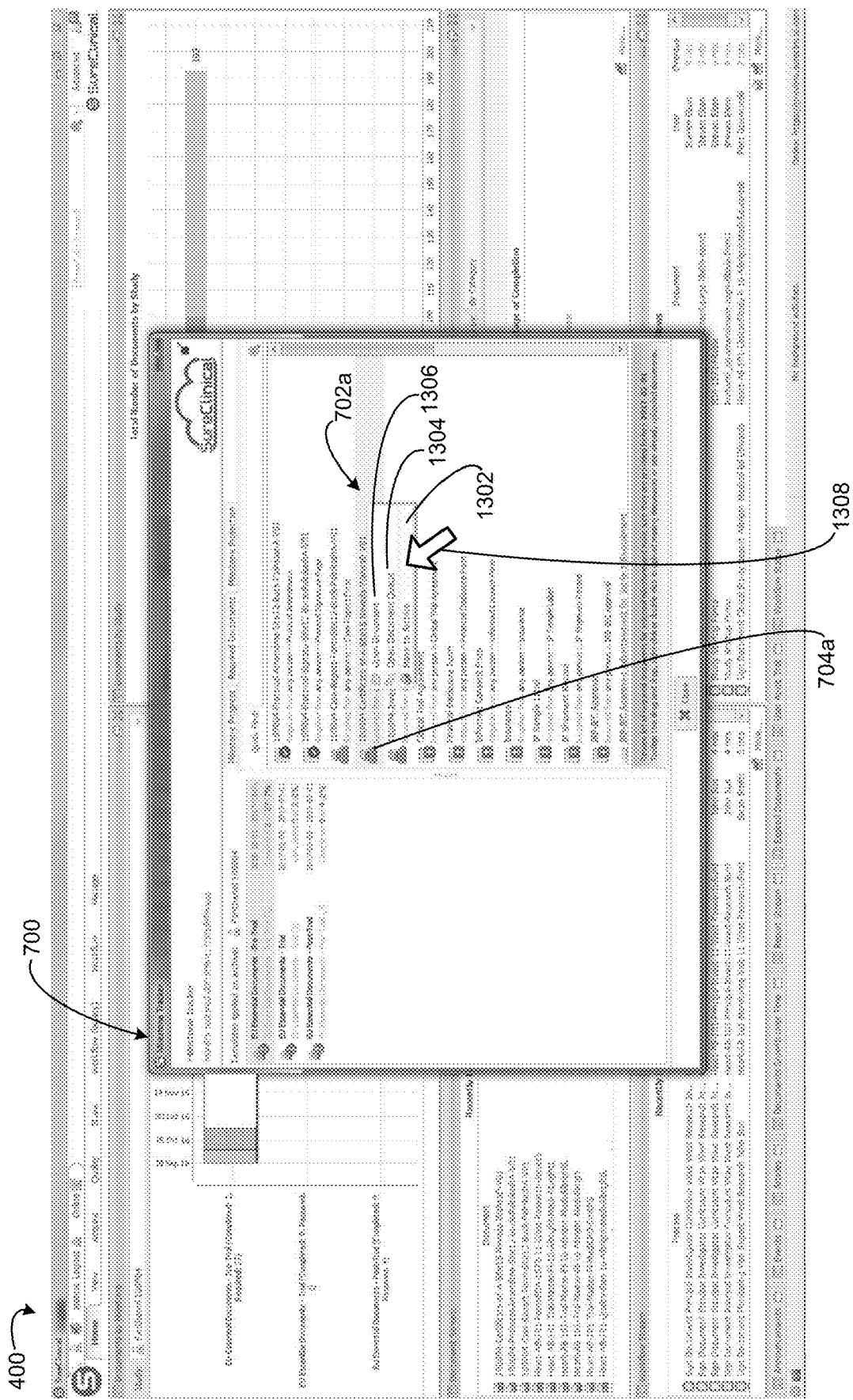
Figure 14:
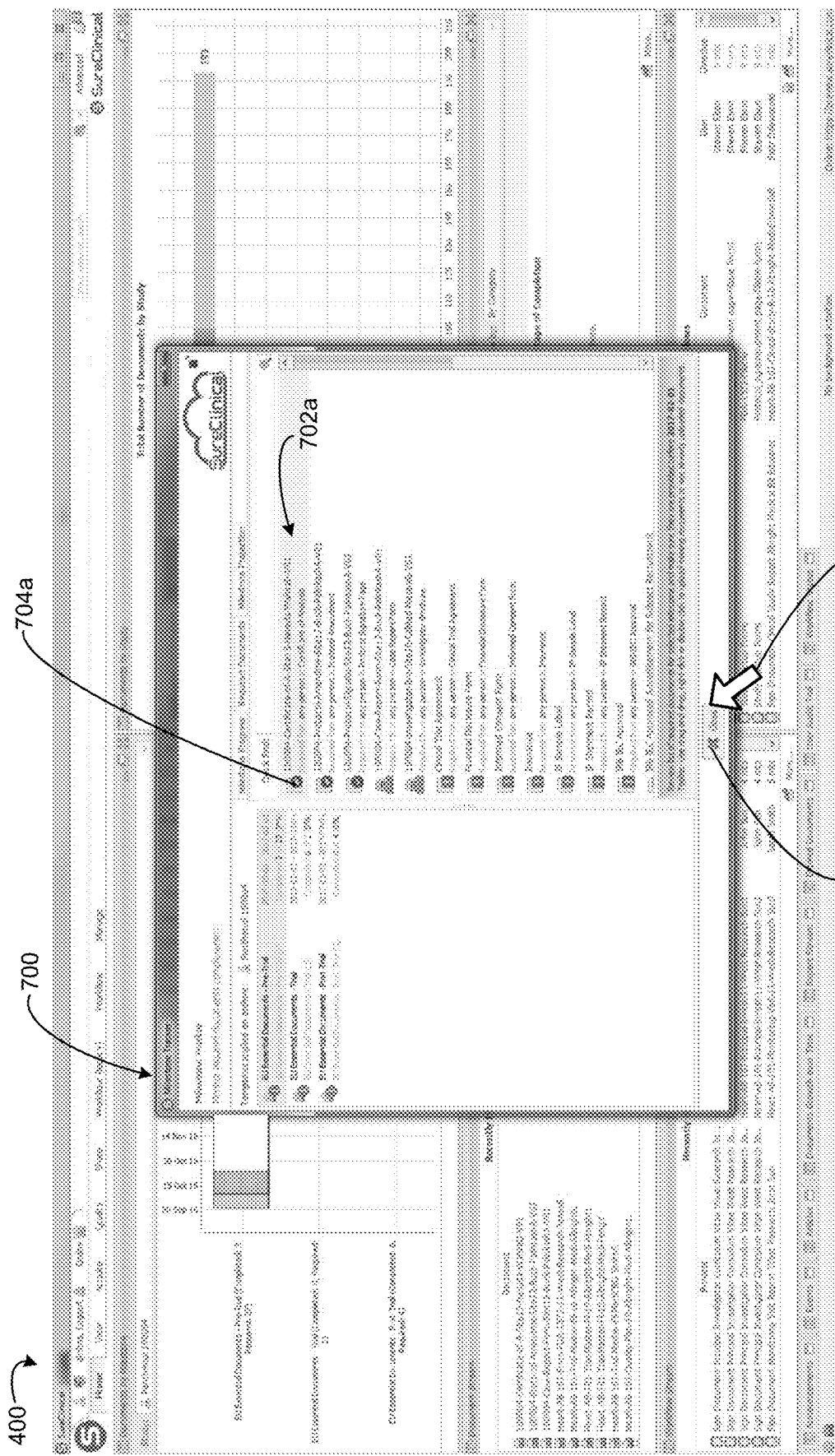

FIGS. 12-14 illustrate user input to change the object status 306 of an object 302 from "uploaded and unreviewed" to "completed," in accordance with some embodiments.

Figure 21:
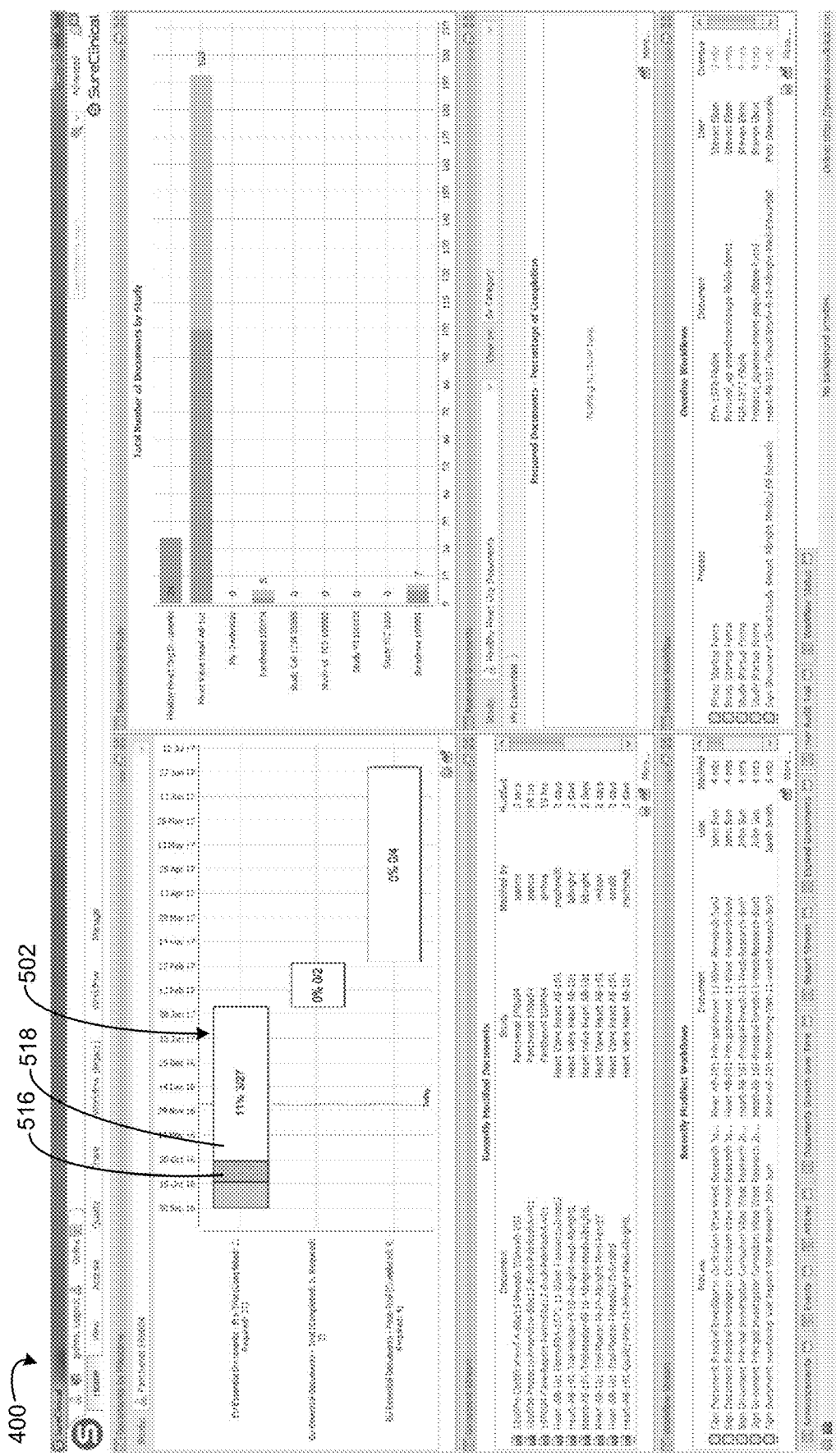

In FIG. 12, dashboard GUI 400 is displayed (after the status of an object 302*a* of task 300*a* corresponding to task completion control 502 is updated from "incomplete" to "uploaded and unreviewed." As a result of the status change, the width of region 516 that indicates a number of objects 302 with an object status 306 of "uploaded and unreviewed" has increased (relative to the width of region 516 in FIG. 11) and the width of region 518 that indicates a number of objects 302 with an object status 306 of "incomplete" has decreased (relative to the width of region 518 in FIG. 21). The width of region 514 (e.g., relative to a width of task completion control 502) that indicates a number of objects 302 with an object status 306 of "completed" is unchanged. An input is detected at a location (e.g., as indicated by pointer icon 1202) that corresponds to task completion control 502. In response to detecting the input, task tracker interface 700 is displayed, as shown in FIG. 13.

In FIG. 13, task tracker interface 700 is displayed (e.g., overlayed over dashboard GUI 400). In task tracker interface 700, the object status 306 indicated by icon 704*a* (included in object information 702*a* that corresponds to object 302*a*) is "uploaded and unreviewed." In response to an input (e.g., a secondary input, such as a right click input) detected at a location (e.g., as indicated by pointer icon 1308) that corresponds to object information 702*a*, a menu is displayed including control 1302 ("Move to Archive") for indicating that review of object content 308 of object 302*a* is complete, control 1304 ("Open Document Queue") for viewing object content 308 of one or more objects with an object status of "uploaded and unreviewed" and control 1306 ("Open Document") for viewing object content 308 of currently selected object 302*a*. In response to an input to select control 1302 (e.g., by releasing a right mouse button while pointer icon 1308 is hovering over control 1302) the status of object 302*a* is changed from "uploaded and unreviewed" to "complete."

In FIG. 14, icon 704*a* that corresponds to object information 702*a* indicates the "complete" status of object 302*a*. An input is received at a location (e.g., as indicated by pointer icon 1402) that corresponds to control 1104 for closing task tracker interface 700. In response to detecting the input, task tracker interface 700 ceases to be displayed, revealing dashboard GUI 400 (as shown in FIG. 15).

Figure 15:
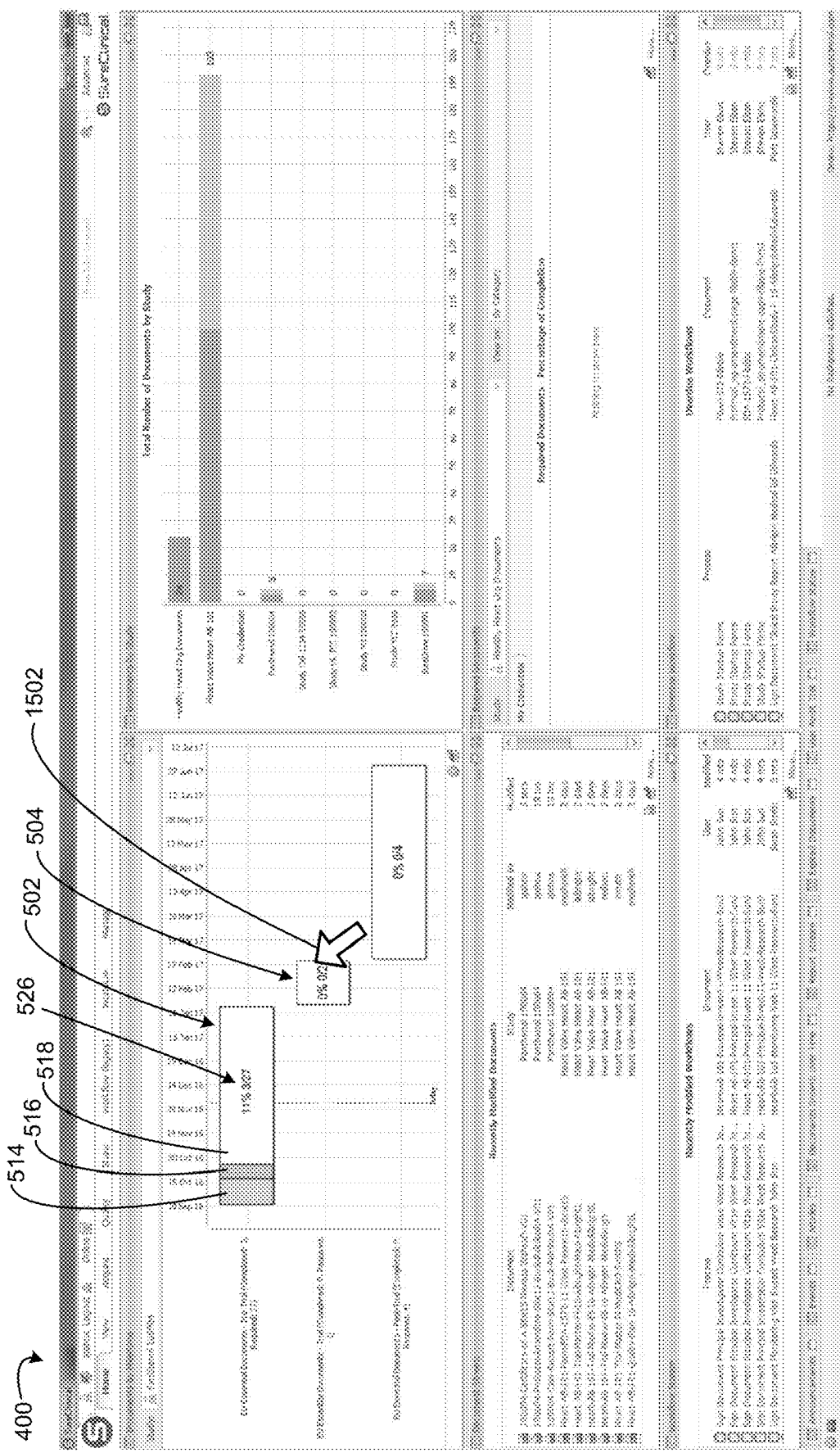
FIGS. 15-16 illustrate user input to display objects that correspond to a second task completion control, in accordance with some embodiments.
Figure 16:
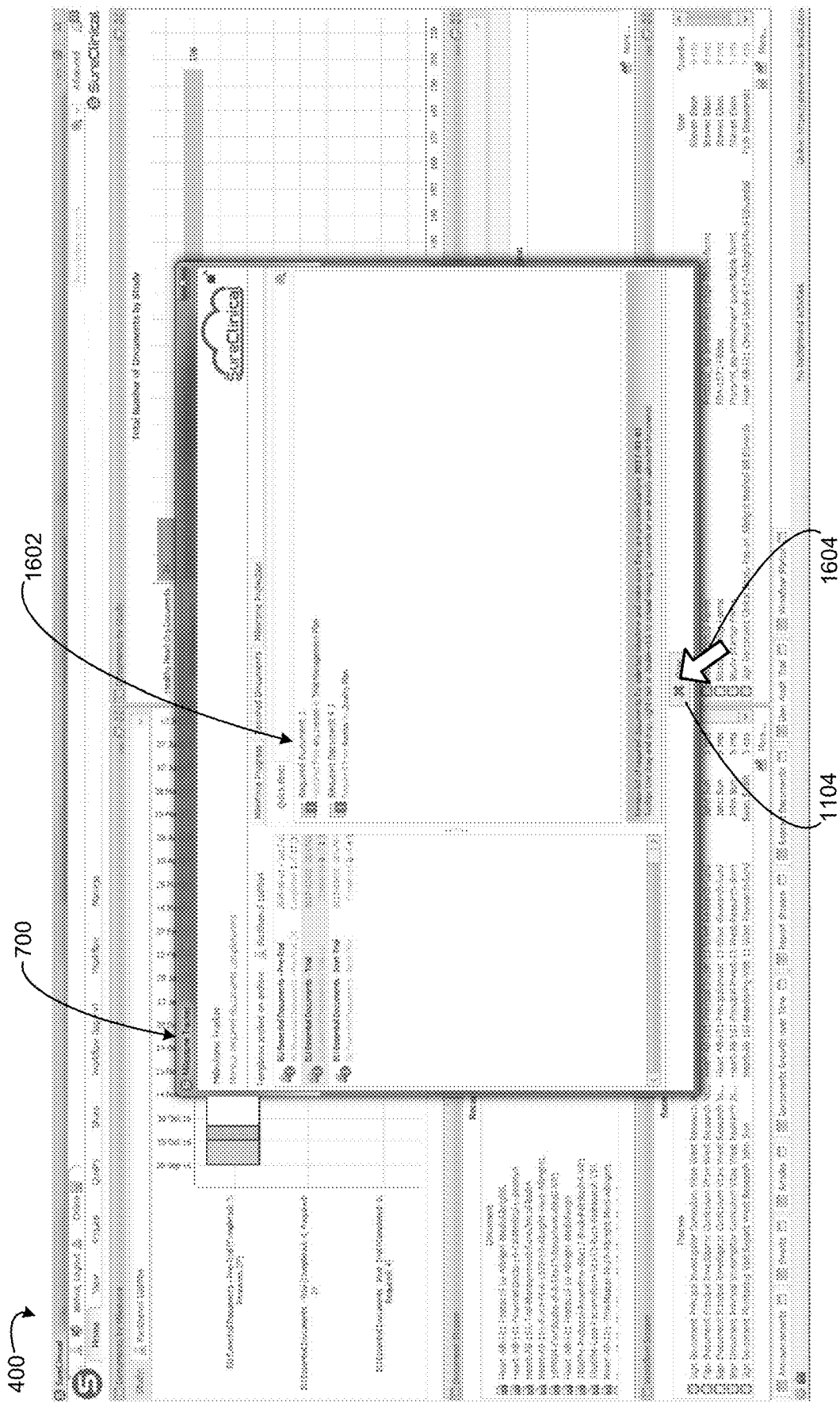

FIGS. 15-16 illustrate user input to display objects that correspond to a second task completion control, in accordance with some embodiments.

In FIG. 15, dashboard GUI 400 is displayed (after the status of an object 302*a* is updated from "uploaded and unreviewed" to "complete." As a result of the status change, the width of region 514 that indicates a number of objects 302 with an object status 306 of "complete" has increased and the width of region 514 that indicates a number of objects 302 with an object status 306 of "uploaded and unreviewed" has decreased. Task status indicator 526 has changed from displaying "7% 2/27" in FIG. 5 to displaying "11% 3/27" in FIG. 15, indicating that the number of completed objects 302 for task 302*a* has increased. The width of region 514 (e.g., relative to a width of task completion control 502) that indicates a number of objects 302 with an object status 306 of "completed" is unchanged.

An input is detected at a location (e.g., as indicated by pointer icon 1502) that corresponds to task completion control 504. In response to detecting the input, task tracker interface 700 is displayed, as shown in FIG. 16.

In FIG. 16, task tracker interface 700 is displayed (e.g., after input was received at a location that corresponds to task completion control 504). When task tracker interface 700 is displayed in response to input received at a location that corresponds to task completion control 504, task tracker interface 700 includes a plurality of representations 1602 of objects 302 associated with task completion control 504. Representations 1602 of objects 302 associated with task completion control 504, as shown in FIG. 16, are distinct from representations 702 of objects 302 associated with task completion control 502, as shown in FIG. 7.

An input is detected at a location (e.g., as indicated by pointer icon 1604) that corresponds to a control 1104 for closing task tracker interface 700. In response to detecting the input, task tracker interface 700 ceases to be displayed, revealing dashboard GUI 400 (as shown in FIG. 17).

FIGS. 17-21 illustrate a drag-and-drop approach for selecting a document as object content 508 for a selected object 302, in accordance with some embodiments. When the document is selected as object content 508 for the selected object 302, the object status 306 of the selected object changes from "incomplete" to "uploaded and unreviewed."

Figure 17:
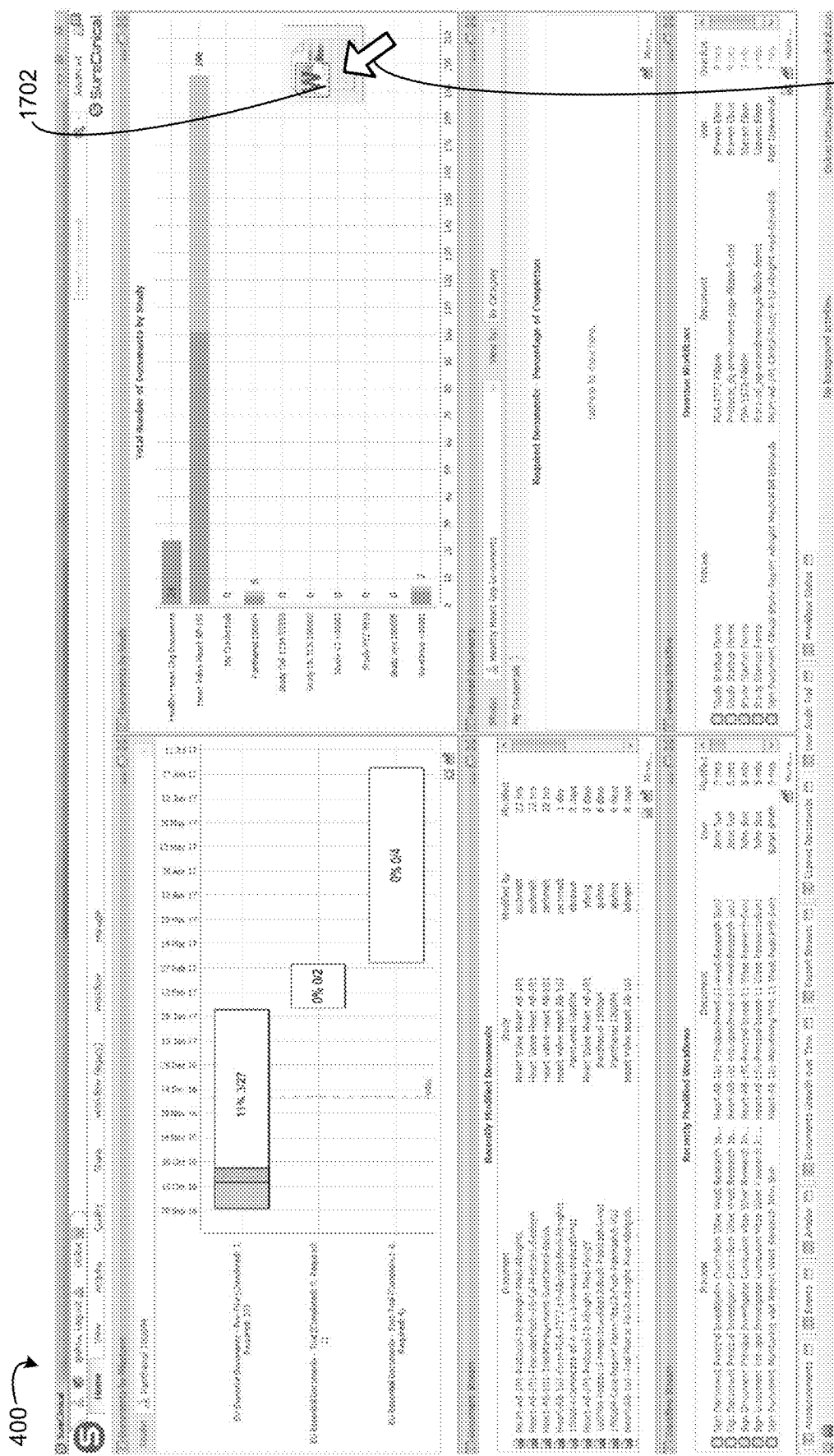
FIGS. 17-21 illustrate a drag-and-drop approach for selecting a document as object content for a selected object, in accordance with some embodiments.
Figure 18:
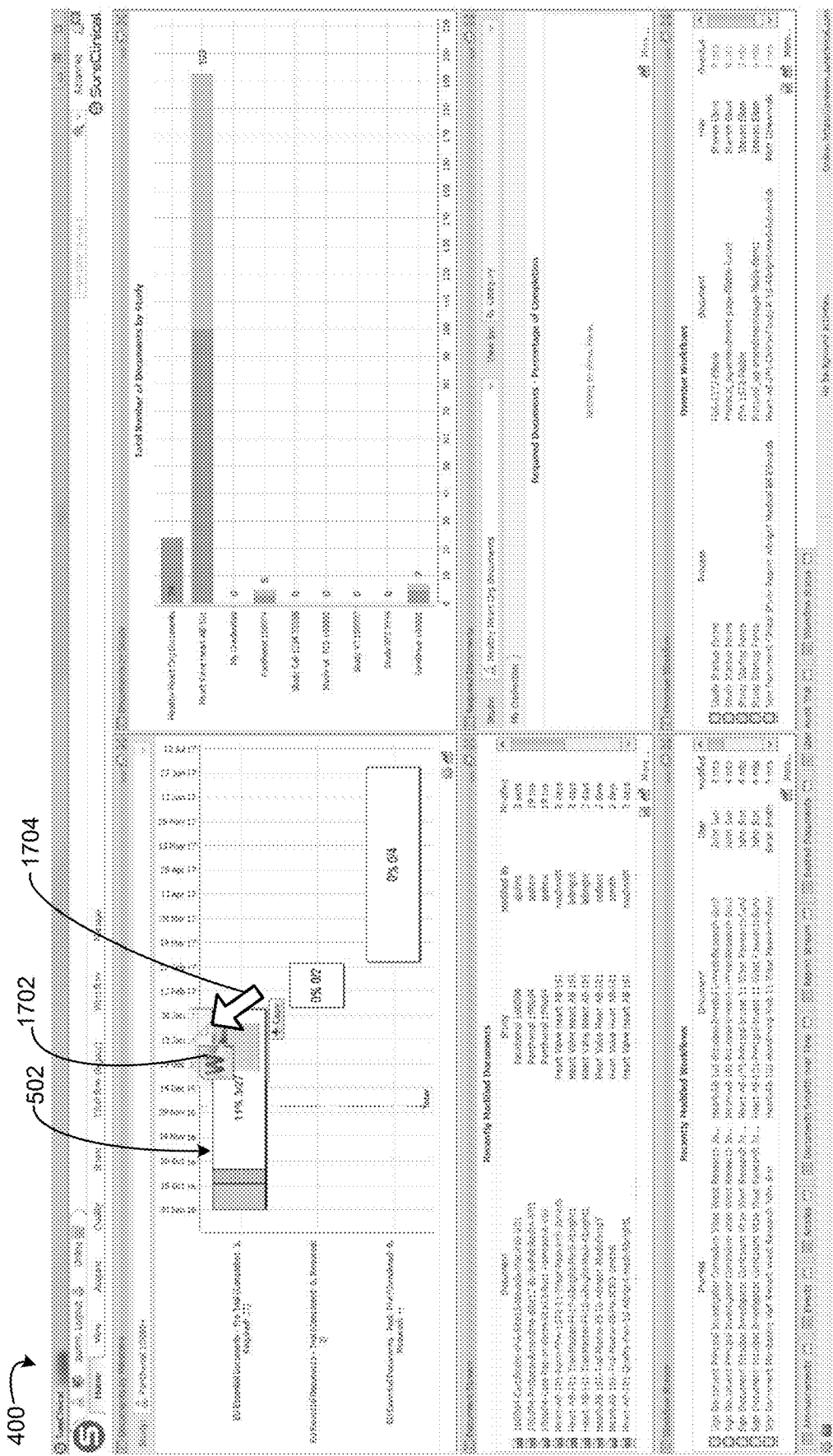
Figure 19:
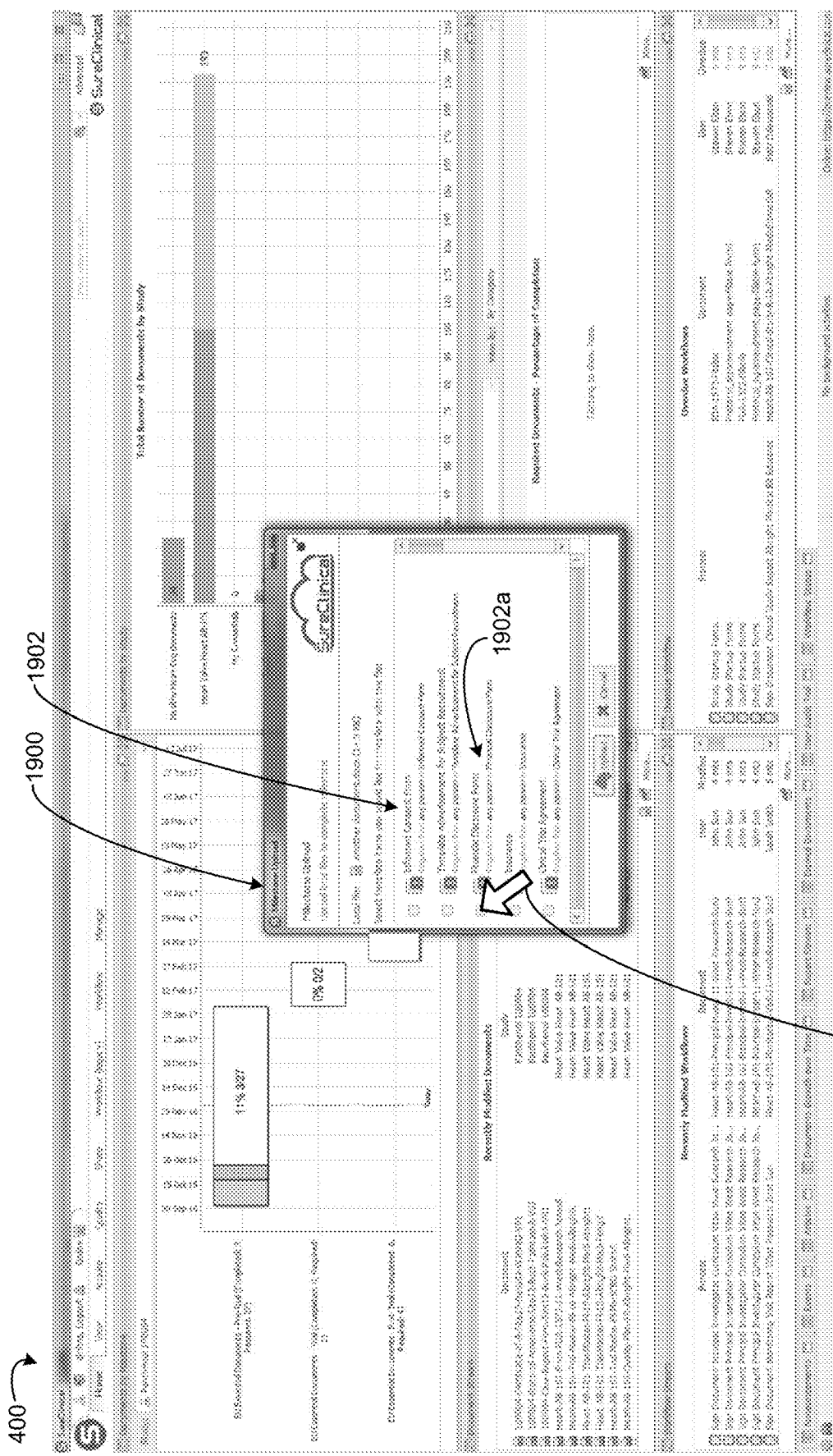

In FIG. 17, a document 1702 has been selected (e.g., by input received at a location corresponding to an initial position of document 1702), and while the document 1702 is selected ("picked up"), the input drags the document from a first location, as indicated by pointer icon 1704 as shown in FIG. 17, to a second location, as indicated by pointer icon 1704 as shown in FIG. 18. The second location of the document 1702 corresponds to a location of task completion control 502. In response to detecting that document 1702 is dropped at the location that corresponds to task completion control 502, a quick upload interface 1900 is displayed, as shown in FIG. 19. A plurality of representations 1902 of objects 302 that correspond to task completion control 502 are displayed in quick upload interface 1900. In some embodiments, the plurality of objects 302 that correspond to task completion control 502 are filtered, for example, such that objects 302 with an "uploaded and unreviewed" object status 306 and/or objects 302 with a "completed" object status 306 are filtered out and representations 1902 of objects 302 with an "incomplete" object status 306 are displayed in quick upload interface 1900. In an illustrative example, the representations 1902 of objects 302 include identifying information (e.g., object title, such as "Financial Disclosure Form") for document placeholders.

In FIG. 19, an input is detected at a location (e.g., as indicated by pointer icon 1904) that corresponds to a representation 1902*a* of an object (e.g., object 302*b*) of the the representations 1902 of objects 302 that are displayed in quick upload interface 1900. In response to detecting the input, representation 1902*a* object 302*b* includes an indication that the respective object 302*b* is checked.

Figure 20:
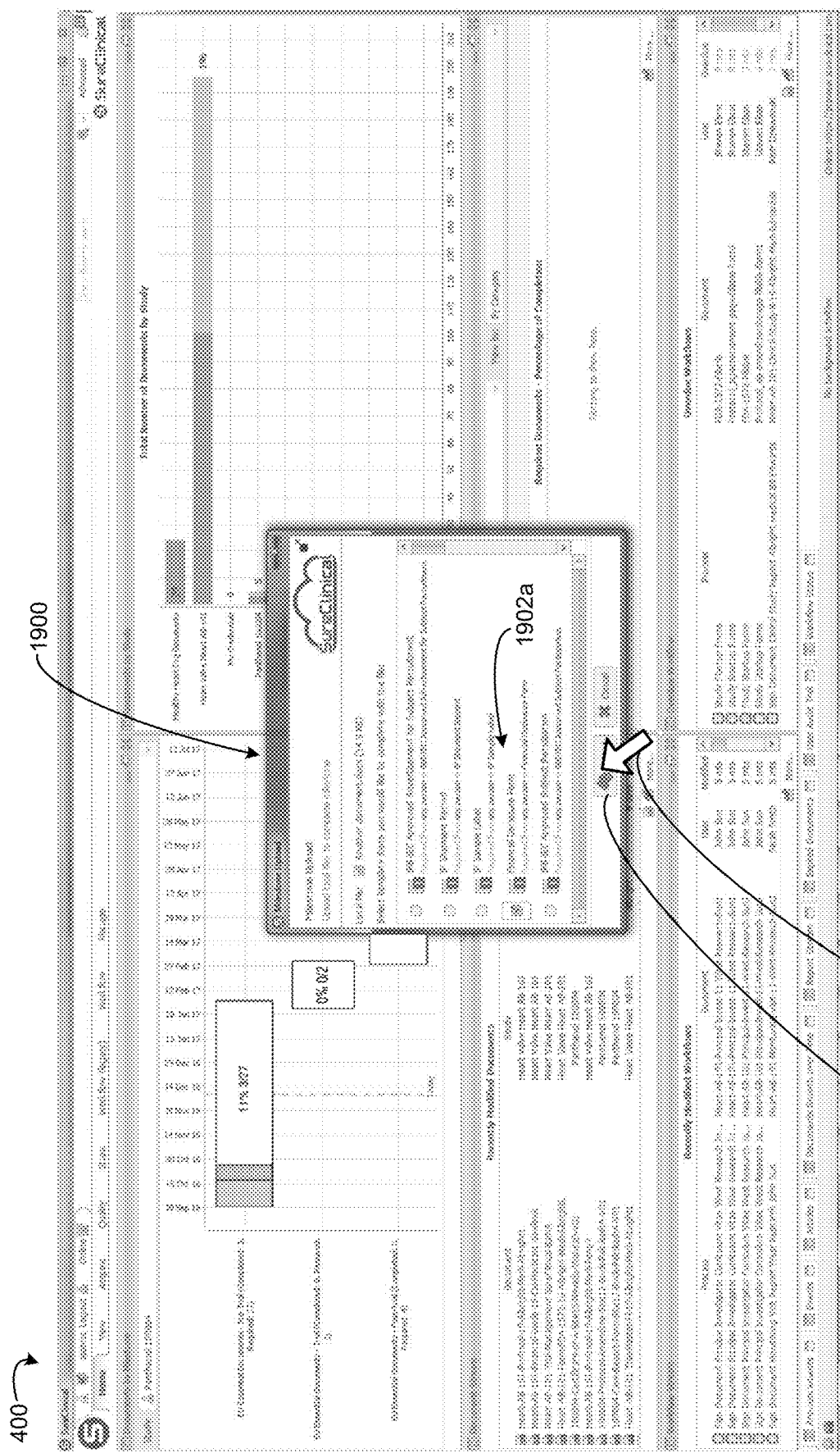

In FIG. 20, an input is detected at a location (e.g., as indicated by pointer icon 2002) that corresponds to a control 2004 for uploading the dragged-and-dropped document 1702. In response to detecting the input, document 1702 is uploaded as object content 308, the status of object 302*b* is adjusted from "incomplete" to "uploaded and unreviewed," and quick upload interface 1900 ceases to be displayed, revealing dashboard GUI 400, as shown in FIG. 21. In FIG. 21, the width of region 516 that indicates a number of objects 302 with an object status 306 of "uploaded and unreviewed" has increased (relative to the width of task completion control 502), and the width of region 518 that indicates a number of objects 302 with an object status 306 of "incomplete" has decreased (e.g., relative to the width of task completion control 502).

In some embodiments, after the upload of a dragged-and-dropped document 1702 or other object 302 occurs (e.g., in response to input detected at control 2004), a task tracking interface 700 is automatically displayed (e.g., to allow a user to review the recently uploaded object 302 with an object status 306 of "uploaded and unreviewed"). In some embodiments, after the upload of a dragged-and-dropped document 1702 or other object 302 occurs, task tracking interface 700 is not displayed.

Figure 22:
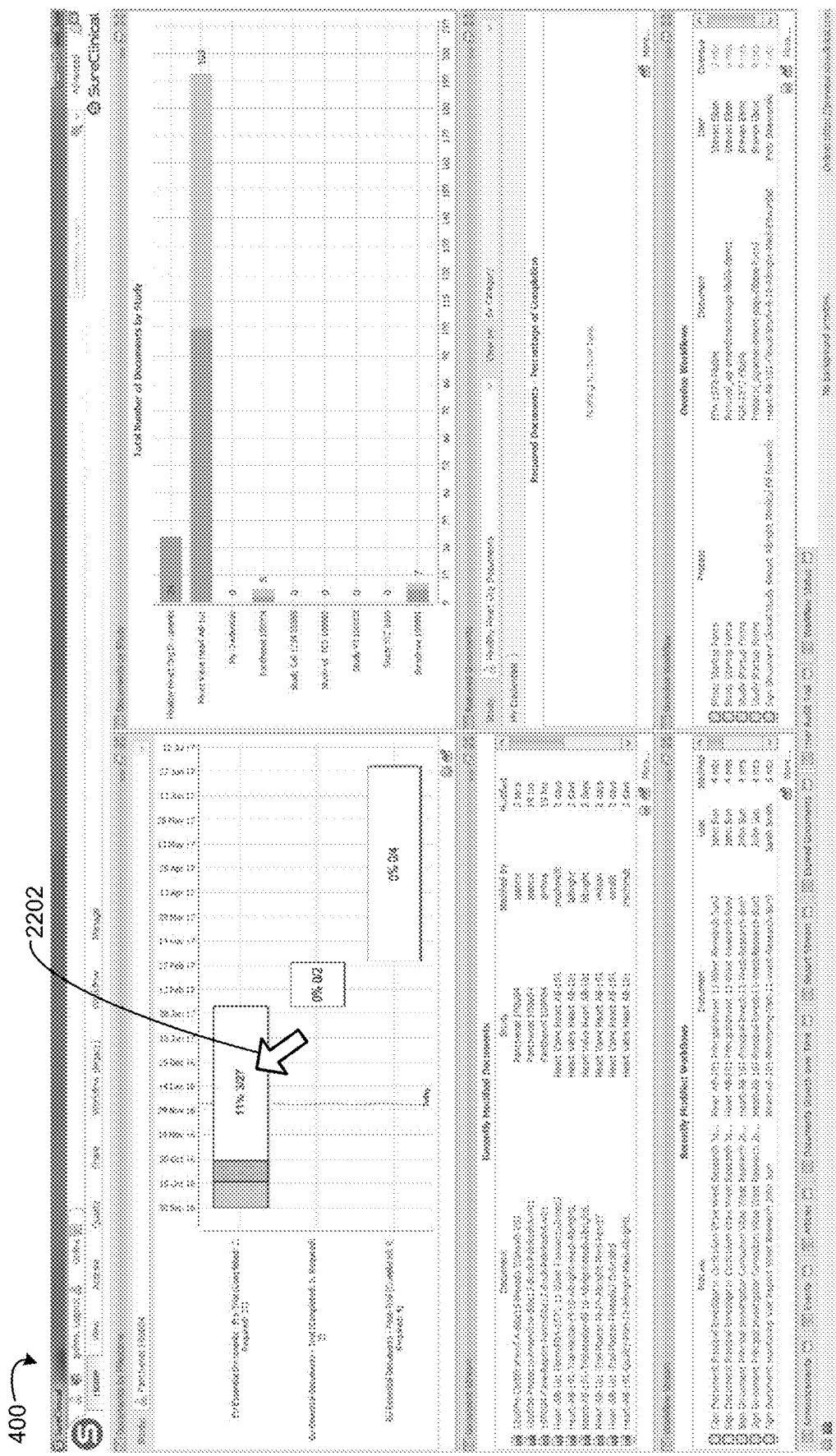
FIGS. 22-28 illustrate display and manipulation of task completion projection information.
Figure 23:
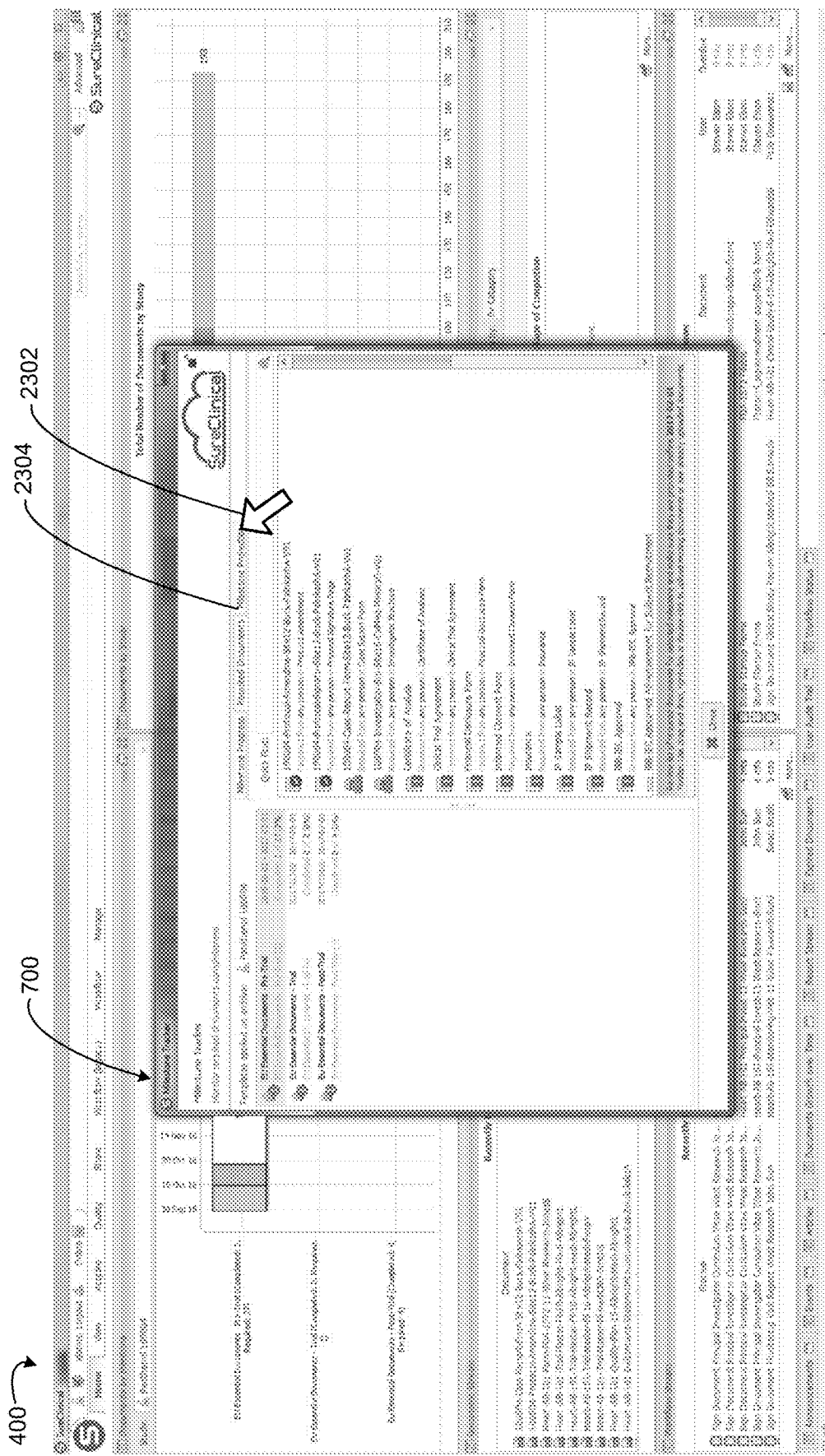
Figure 24:
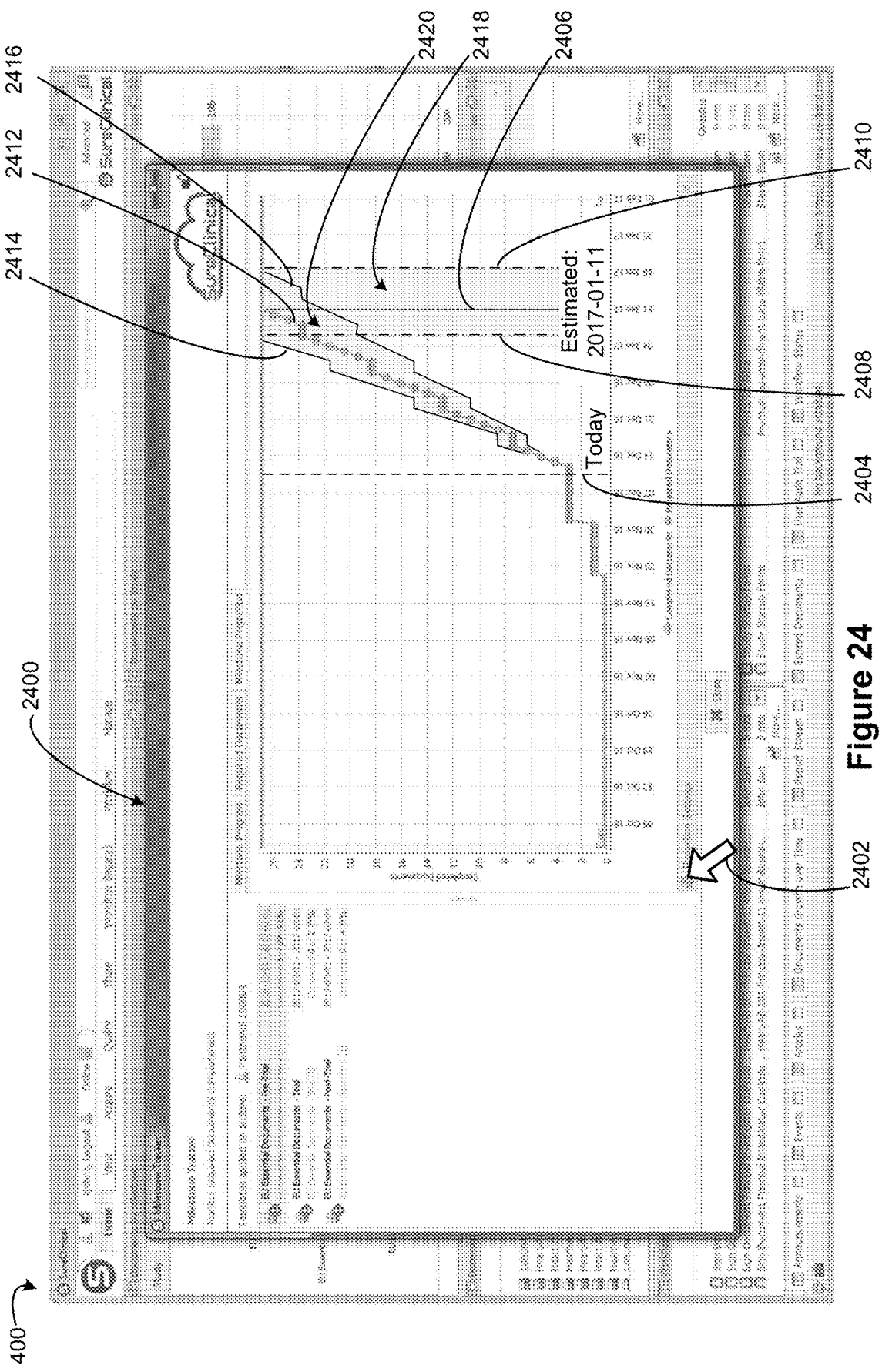

FIGS. 22-28 illustrate display and manipulation of task completion projection information. In FIG. 22, an input is detected at a location (e.g., as indicated by pointer icon 2202) that corresponds to task completion control 502. In response to detecting the input, task tracker interface 700 is displayed, as shown in FIG. 23. In FIG. 23, an input is detected at a location (e.g., as indicated by pointer icon 2302) that corresponds to milestone completion tab 2304 of task tracker interface 700. In response to detecting the input, task completion projection interface 2400 is displayed, as shown in FIG. 24.

In FIG. 24, task completion projection interface 2400 is displayed (e.g., overlayed over dashboard GUI 400). Because the input to display task tracker interface 700 was received at task completion control 502, which corresponds to task 300a, task completion project interface 2400 includes information pertaining to completion of task 300a. Information pertaining to completion of task 300a includes, for example, an estimated completion date 2406 of task 300a, an estimated completion date range 2418 (e.g., an area between an earliest estimated date as indicated by the line 2408 and latest estimated date as indicated by the line 2410), and/or information about the projected rate of progress 2412 for task 300a over time. In some embodiments, task completion project interface 2400 displays a current date as indicated by the line 2404.

In some embodiments, a projected rate of progress 2412 is determined using a linear regression analysis using the following equation:

$$x = ay^*p + b$$

where x=time to complete a task component (e.g., time a person 314 required to change an object status 306 of an object 302 from "incomplete" to "complete"), a=the regression slope coefficient, y=a value representing an object 302 in a sequence of objects 302 required for task 300a, p is a productivity factor (e.g., of a person 314), and b is an x-axis intercept. In some embodiments, as described further with regard to FIG. 3, a projected rate of progress 2412 for a task 300a is determined using one or more productivity factors (e.g., a historical productivity value 316 and/or a historical efficiency value 318) for each person 314 included in task 300a (FIG. 3). In some embodiments, a confidence region 2420 between a plot of upper confidence limit values (indicated by line 2414) and lower confidence limit values (indicated by line 2416) is displayed.

In an illustrative example, person 314a, person 314b, and person 314c are associated with a task 300a that includes 27 objects 302. An (x,y) pair is determined for y=1, 2, 3, . . . , 27 (corresponding to the 27 objects 302) for person 314a, person 314b, and person 314c. In this way, a target progress rate and target end date are determined using stored information about a number of objects 302 of a task 300a, object statuses 306 of the objects 302, people 314 associated with task 300a, and productivity information available for people 314. The target progress rate is shown as the projected rate of progress 2412 in FIGS. 24-28.

In some embodiments, the projected rate of progress 2412 for task 300a is a variable rate (as in the illustrative example of FIG. 24). For example, a projected rate of progress 2412 is a non-linear function (e.g., that takes into account days of the week on which work does not occur and/or anticipated acceleration of work at the end or at other points in the project). To account for non-linear functions, non-linear regression methods (as are known in the art) are used.

In some embodiments, a projected rate of progress 2412, estimated completion date 2406, confidence region 2420, and/or estimated completion date range 2418 are updated, for example, at a time that an object status 308 of an object 302 is changed, at a time that task completion project interface 2400 is accessed by a user, and/or on a periodic basis.

Figure 25:
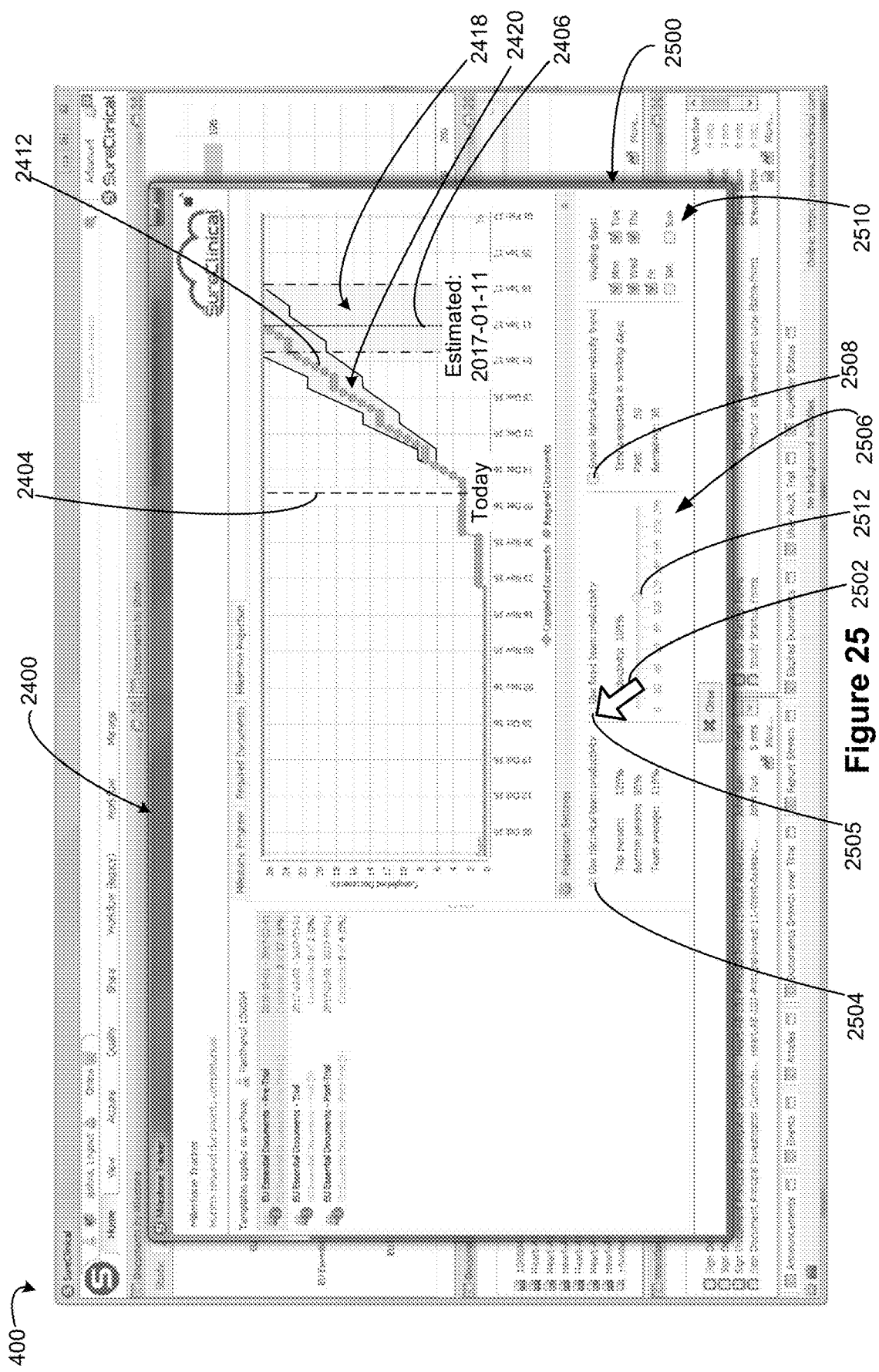

In FIG. 24, an input is detected at a location (e.g., as indicated by pointer icon 2402) that corresponds to viewing a projection settings user interface 2500. In response to detecting the input, projection settings user interface 2500 is displayed (e.g., within task completion projection interface 2400), as shown in FIG. 25.

In some embodiments, projection settings user interface 2500 includes a historical team productivity selection control 2504 for viewing and/or recalculating a projected rate of progress 2412, estimated completion date 2406, confidence region 2420, and/or estimated completion date range 2418 based on historical team productivity 2504 for one or more people 314 (e.g., people 314 of a task 300 for which productivity data is being displayed).

In some embodiments, projection settings user interface 2500 includes a fixed team productivity selection control 2505 for viewing and/or recalculating a projected rate of progress 2412, estimated completion date 2406, confidence region 2420, and/or estimated completion date range 2418 based on a fixed productivity value. In some embodiments, projection settings user interface 2500 includes a productivity slider control 2506 for adjusting a fixed productivity value used to view and/or recalculate a projected rate of progress 2412, estimated completion date 2406, confidence region 2420, and/or estimated completion date range 2418. In some embodiments, the fixed team productivity value is used in lieu of historical user productivity data.

In some embodiments, projection settings user interface 2500 includes a historical team velocity trend control 2508 for viewing and/or recalculating a projected rate of progress 2412, estimated completion date 2406, confidence region 2420, and/or estimated completion date range 2418 in accordance with historical trend data for one or more people 314 (e.g., people 314 of a task 300 for which productivity data is being displayed) and or one or more tasks 300.

In some embodiments, projection settings user interface 2500 includes a working days selection control 2510 for viewing and/or recalculating a projected rate of progress 2412, estimated completion date 2406, confidence region 2420, and/or estimated completion date range 2418 in accordance with individually selectable designated working days.

An input is detected at a location (e.g., as indicated by pointer icon 2502) that corresponds to team productivity selection control 2505. In response to detecting the input, a projected rate of progress 2412, estimated completion date 2406, confidence region 2420, and/or estimated completion date range 2418 are determined using a fixed team productivity value (e.g., the value indicated by slider control 2506, 110) as shown in FIG. 26.

Figure 26:
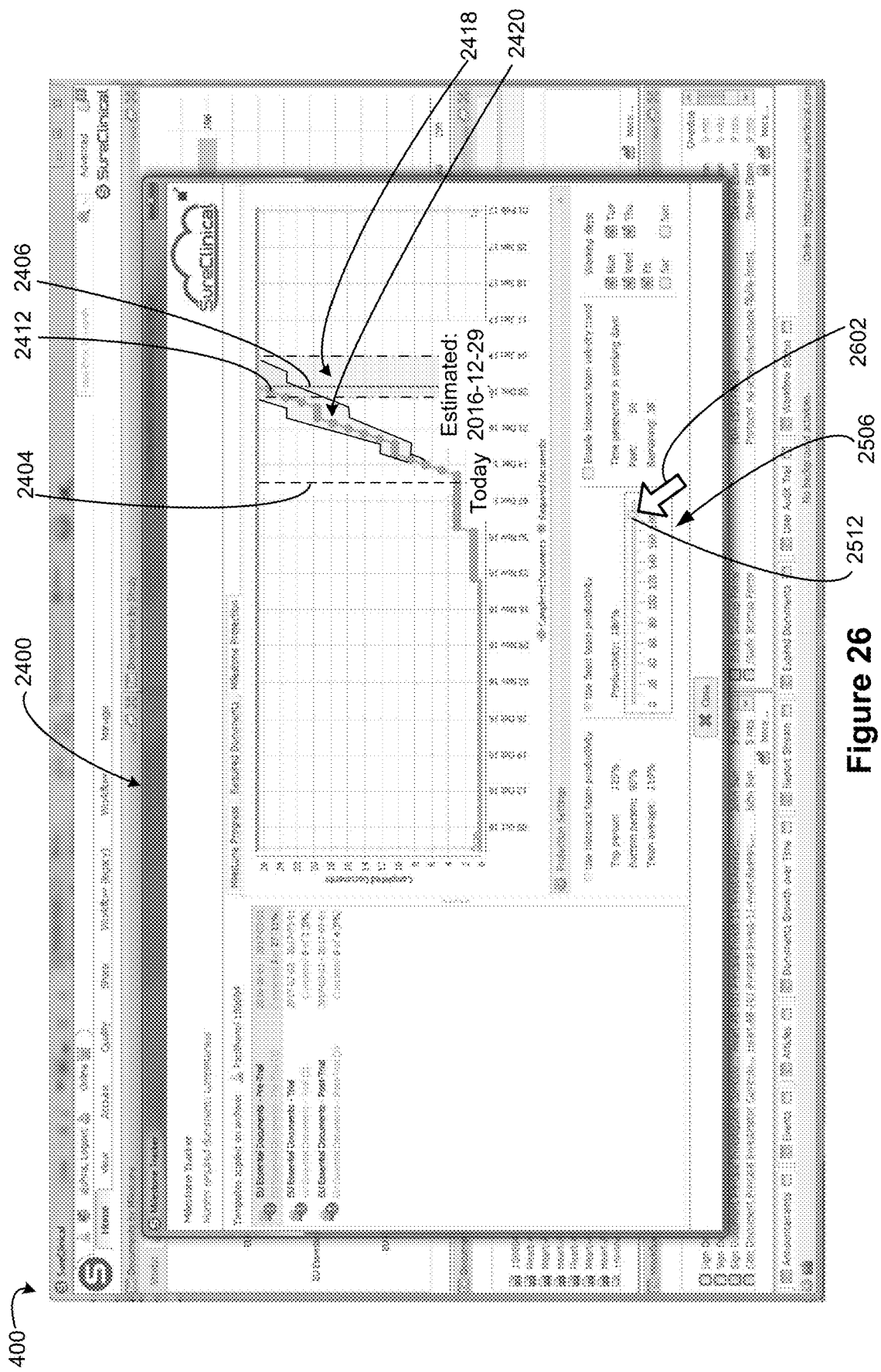

In FIG. 26, an input is received that moves a slider handle 2512 along slider control 2506 to change a productivity control value of productivity control slider 2506 from a first value (e.g., 110, as indicated in FIG. 25) to a second value (e.g., 185, as indicated in FIG. 26). The position of pointer icon 2602 after dragging handle 2512 along slider 2506 is shown in FIG. 26. In response to detecting the input, a fixed team productivity value (corresponding to the value indicated by slider control 2506) is changed from 110 to 180, as shown in FIG. 26, causing projected rate of progress 2412, estimated completion date 2406, confidence region 2420, and/or estimated completion date range 2418 to be recalculated.

Figure 27:
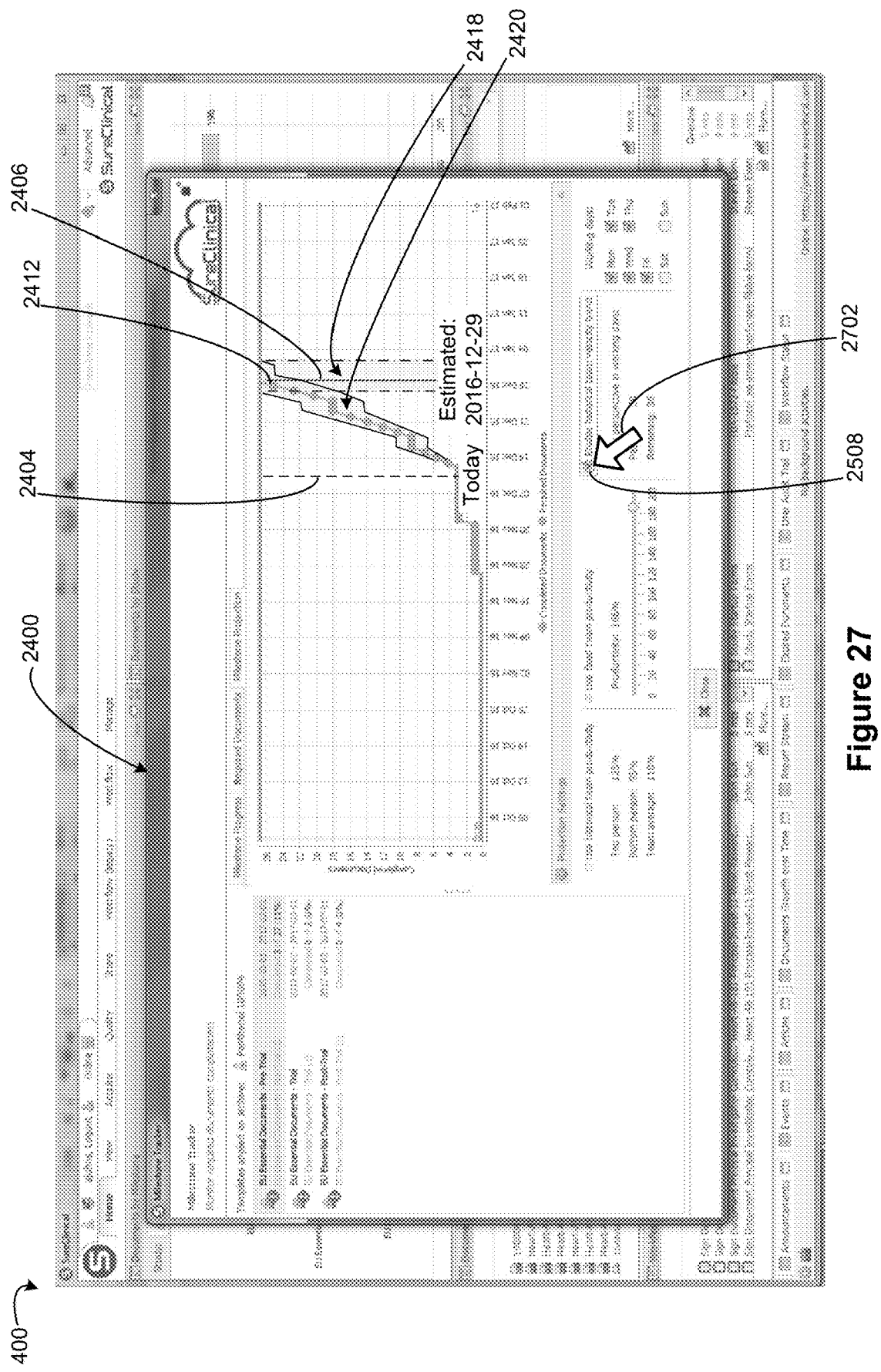

In FIG. 27, an input is detected at a location (as indicated by position icon 2702) that corresponds to historical team velocity trend control 2508. In response to detecting the input, a historical team velocity calculation occurs, causing projected rate of progress 2412, estimated completion date 2406, confidence region 2420, and/or estimated completion date range 2418 to be recalculated. The historical team velocity trend calculation uses values determined from analyzed completed tasks. For example, team productivity typically increases as a deadline approaches. In some embodiments, the calculation determines a set of one or more productivity values for one or more people 314 (or the average across a team) over the course of a previously completed task 300 and uses the productivity values to determine projected rate of progress 2412, estimated completion date 2406, confidence region 2420, and/or estimated completion date range 2418.

Figure 28:
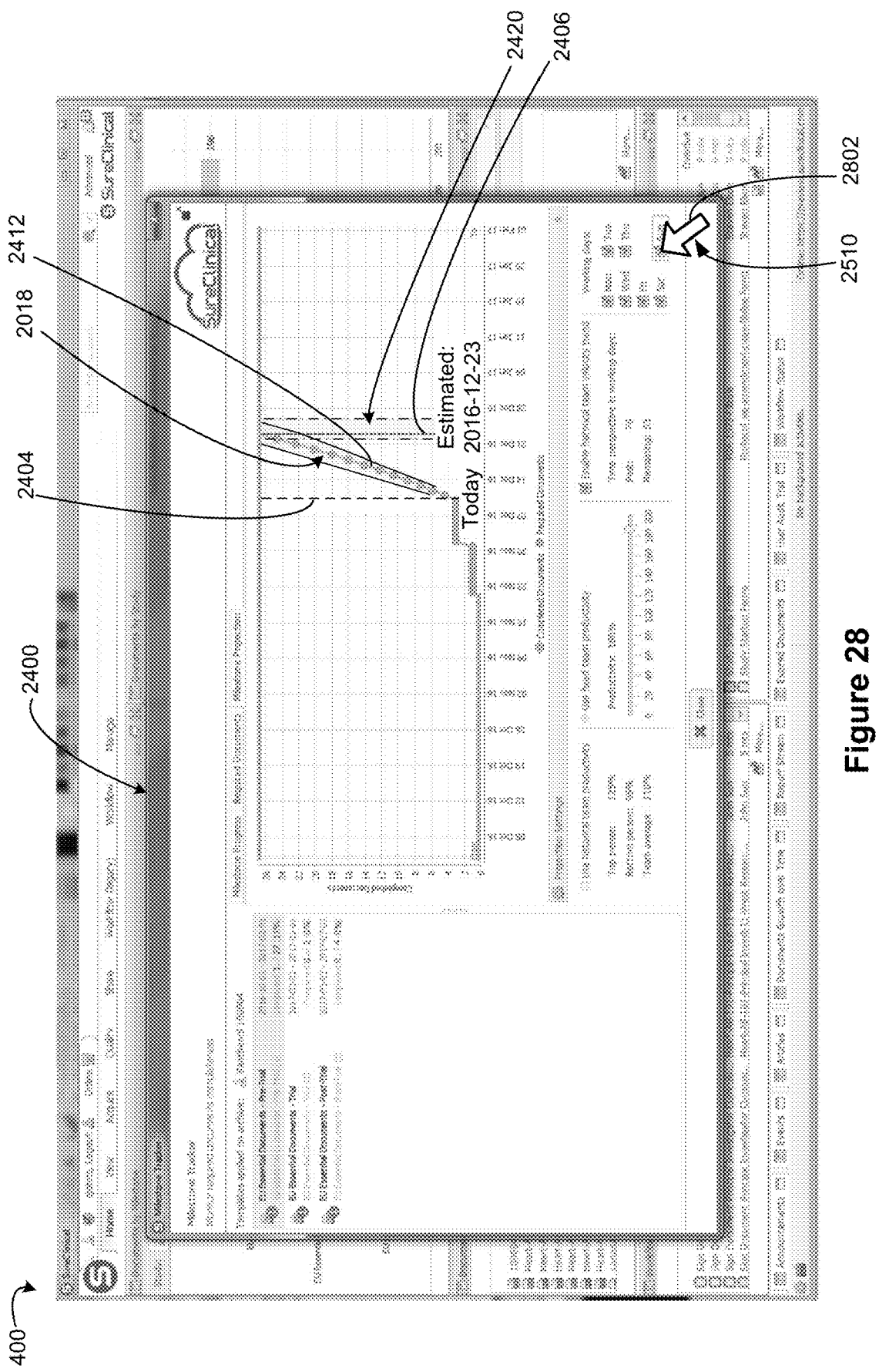

In FIG. 28, an input is detected at locations (as indicated by position icon 2802) that correspond to working days selection control 2510. In response to detecting input that has checked previously unchecked boxes corresponding to "Saturday" and "Sunday" (to cause these days to be considered working days), a projected rate of progress 2412, estimated completion date 2406, confidence region 2420, and/or estimated completion date range 2418 are determined and/or recalculated.

FIG. 29 illustrates a user directory application interface 2900 for a user directory application 112, in accordance with some embodiments. Typically, user directory application 112 is executed by a processor 130 of user device 100 and user application 112 receives information (e.g., project participant information) from a user directory application back end 212 that executes on a processor 230 of server 200. User directory application interface 2900 displays, for example, information about project participants (e.g., project participant Absar Q.) and/or information about connections between project participants. In some embodiments, user directory application interface 2009 includes one or more controls to enable searching for project participants in accordance with search criteria. Project participants are, for example, individuals and/or entities that perform tasks or have the potential to perform tasks related to one or more projects (e.g., projects 110). In some embodiments, a user profile 214 for a person 314 (e.g., a user profile 214a for a person 314a) includes general information 2904 (e.g., name, description, organizations, affiliations, therapeutic areas, customizable information (e.g., attachments), time zone, identifying information in project management application 108, and/or contact information), project information 2906 (e.g., a list of one or more projects 110 with which a user has been involved), experience information 2908 (e.g., employer, employment role, employment length, employment dates, employment features), and information 2910 about other users with which a user is connected.

In some embodiments, user profile information 214 includes productivity data (e.g., a historical productivity value 316) and/or efficiency data (e.g., a historical efficiency value 318) for a person 314. In some embodiments, at least a portion of information in a user profile 214, such as productivity data and/or efficiency data, is not displayed in user directory application interface 2900. In some embodiments, efficiency and/or productivity values stored in a respective user profile 214 (e.g., user profile 214a) are automatically updated in response to operations performed in project management application 108. For example, efficiency and/or productivity values for a person 314 are updated each time a project 110 ends, at a time an object status 308 of an object 302 is changed, at a time that information for a user 314 is accessed by project management application 108, and/or on a periodic basis. In some embodiments, a productivity value stored in a user profile 214 is determined based on a historical productivity value 316 and/or a historical efficiency value 318.

In some embodiments, a productivity value stored in a user profile 214, a historical productivity value 316 and/or a historical efficiency value 318 are determined using one or more of the following factors: average productivity score across multiple people 314, such as an average across all stored user profiles 214 and/or average across all a filtered set of stored user profiles 214 (e.g., filtered by team, by organization, by a person's role, by an institution's role, and/or by country).

In some embodiments, a drag and drop operation as described with regard to FIGS. 17-21 is used to designate object content 308 of an object 302 that is associated with a task for which data is displayed in task completion projection interface 2400. For example, in response to an input that drags a representation 1702 of a document over task completion projection interface 2400 and that drops the document on task completion projection interface 2400 (e.g., on the graph section of task completion project interface 2400), a quick upload interface 1900 is displayed for uploading the document that corresponds to representation 1702 as object content 308 of an object 302.

In some embodiments, in response to an input received at task completion projection interface 2400 (e.g., on the graph section of task completion project interface 2400), a task tracker interface 700 is displayed. Task tracker interface 700 displays information associated with one or more objects that correspond to the task for which data is displayed in task completion projection interface 2400. A user may then select object content 308 for an object 302 using the interfaces and operations described with regard to FIGS. 6-12.

FIGS. 30A-30C are flow diagrams illustrating a method 3000 for updating a tack component status, in accordance with some embodiments. The method 3000 is performed at a device, such as user device 100 and/or server 200. For example, instructions for performing the method 3000 are stored in the memory 104 (or a memory 204 of server device 200) and executed by the processor(s) 130 of the user device 100 (or by processor(s) 230 of server 200).

The device displays (3002), on a display (e.g., output device 138) of an electronic device (e.g., user device 100), a first graphical user interface (e.g., dashboard GUI 400, task completion interface 402, and/or task completion projection interface 2400) that includes a first task completion control (e.g., task completion control 502, FIG. 5).

The first task completion control includes (3002a) indicia of a first time range that corresponds to a first task (e.g., task 300a, FIG. 3), where the first task includes a first plurality of task components (e.g., objects 302a-302c).

In some embodiments, a first time range is a length of time (e.g., corresponding to a width of a task completion control 508) between a first start date 310 (e.g., as indicated by the left edge 508 of task completion control 502) and an first end date 312 (e.g., as indicated by the right edge 510 of task completion control 502). In some embodiments, a first time range is a time period of, for example, minutes, hours, days, months, and/or years. In some embodiments, a task component is an object 302 (e.g., a content item (e.g., a file, such as a document, image, video, and/or audio), a directory (e.g., a folder that contains one or more content items), an application, a link (e.g., a link to a website, content item, directory, and/or application) and/or a representation of a content item (e.g., document placeholder).

The first task completion control also includes (3002b) indicia that correspond to at least one completed task component of the first plurality of task components. In some embodiments, indicia that correspond to at least one completed task component of the first plurality of task components include a representation of a number, for example, a number, a dimension of a region and/or one or more icons. For example, a width of first region 514 (e.g., relative to a width of task completion control 502, FIG. 5) indicates a number of completed task components of the plurality of task components associated with a task 302. In another example, a number (e.g., the number 2 as shown at task status indicator 526) displayed at a location that corresponds to a location of task completion control 502 indicates a number of completed task components of the plurality of task components associated with a task 302.

The first task completion control additionally includes (3002c) indicia that correspond to at least one uncompleted task component of the first plurality of task components. For example, a width of a region 518 (e.g., relative to a width of task completion control 502) indicates a number of uncompleted task components (e.g., objects 302 with an object status 306 of "incomplete") of the plurality of task components associated with a task 300.

In some embodiments, first graphical user interface (e.g., dashboard GUI 400, FIG. 4 and/or a task completion interface 402, FIG. 5) includes (3004) a second task completion control (e.g., task completion control 504, FIG. 5) that includes indicia of a second time range that corresponds to a second task (e.g., 300b, FIG. 3), where the second task includes a second plurality of task components (e.g., objects 302d and 302e) that is distinct from the first plurality of task components (e.g., objects 302a-302c).

In some embodiments, in task completion user interface 402 (FIG. 5) a time range of task completion control 504 is indicated by a distance between the position of a start date 310 (as indicated by the left edge 530 of task completion control 504,) and an end date 312 (as indicated by the right edge 532 of task completion control 504).

In some embodiments, the first task completion control (e.g., task completion projection interface 2400) includes (3006) indicia of a projected rate of progress of the first task (e.g., task 300a). For example, a first task completion projection control includes indications of rate of progress 2412, estimated completion date 2406, confidence region 2420, and/or estimated completion date range 2418 to be recalculated.

In some embodiments (3008), a first user (e.g., user 2900, FIG. 29) is associated with the first task (e.g., task 300a).

The projected rate of progress of the first task is determined using productivity information that corresponds to the first user (e.g., a productivity value stored in a user profile 214, a historical productivity value 316, and/or a historical efficiency value 318). For example, a projected rate of progress 2412 is determined using productivity and/or efficiency values stored in a user profile 214 for a user 314 that corresponds to a project 110, a task 300, an object 302 in object metadata 308.

The device detects (3010), at a location that corresponds to the first task completion control (e.g., task completion control 502), a first input (e.g., an input as described with regard to FIG. 6). In some embodiments, a location that corresponds to the first task completion control 502 is a location within a perimeter of task completion control 502. In some embodiments, a location that corresponds to the first task completion control 502 includes an area outside of first task completion control 502, such as an area within a predefined distance of the perimeter of first task completion control 502. In some embodiments, when an input is detected, the device determines a respective task completion control of multiple task completion controls (e.g., 502, 504, 506) to which a location at which an input was received is closest, and if the location at which the input was received is closest to task completion control 502, then the input is determined to have been received at a location that corresponds to the first task completion control 502.

In some embodiments, the first input moves (3012) a representation of an object (e.g., representation 1702 of a document) that corresponds to the respective uncompleted task component (e.g., a respective object 302) to the location that corresponds to the first task completion control (e.g., task completion control 502). For example, the first input picks up a representation 1702 of a document from a source directory, drags the representation 1702 of the document from a first location (as shown in FIG. 17) to a second location (as shown in FIG. 18), and drops the representation 1702 of the document at a location that corresponds to task completion control 502.

In response to detecting the first input, the device performs (3014) at least one operation to change a status (e.g., object status 306) of a respective uncompleted task component (e.g., object 302a) of the first plurality of task components (e.g., objects 302a-302c). The at least one operation includes, for example, an operation to select content as object content 308 of an object 302, an operation to review selected content, an operation to confirm selected content as object content 308 of an object 302, an operation to review object content 308 of an object 302, and/or an operation to change the state of an object 302. For example, the at least one operation includes one or more of:

displaying a task tracker interface 700 (FIG. 7);

detecting input to select a representation 1702 of an object 302 in task tracker interface 700 (e.g., as described with regard to FIG. 7);

displaying an object content upload interface 800 (FIG. 8);

detecting an input to display an object content selection interface (e.g., file selection interface 900, FIG. 9);

detecting an input to select object content 308 as content for an object 302 (e.g., as described with regard to FIG. 9;

detecting input at a location that corresponds to a control 1020 for completing the upload of content item 910 as object content 308 of a selected object 302 (e.g., as described with regard to FIG. 10);

detecting an input to change a status of an object from an intermediate object state 306 ("uploaded and unreviewed") to a "completed" object state 306 (e.g., as described with regard to FIG. 13);

displaying a quick upload interface 1900 (FIG. 19);

detecting input at a location corresponding to a representation 1902 of an object 302 displayed is quick upload interface 1900 (e.g., as described with regard to FIG. 19); and detecting input at a location that corresponds to a control 2004 for uploading content as object content 308 of an object 302 (e.g., as described with regard to FIG. 20).

In some embodiments, the at least one operation to change the status of the respective uncompleted task component (e.g., object 302*a*) of the first plurality of task components (e.g., objects 302*a*-302*c*) includes (3016) displaying a second graphical user interface (e.g., task tracker interface 700) that includes selectable object information 702 for selecting an uncompleted task component (e.g., object 302*a*). For example, information 702*a* for object 302*a* as shown in FIG. 7 includes icon 704*a* that indicates that object 302*a* has an object status 306 of "uncompleted."

In some embodiments, the device detects (3018) a second input at a location that corresponds to the control (e.g., selectable object information 702*a*) for identifying the uncompleted task component (e.g., object 302*a*), and in response to detecting the second input at the location that corresponds to the control for identifying the uncompleted task component, the device displays a third graphical user interface (e.g., object content upload interface 800 and/or file selection interface 900) that includes a control (e.g., control 802 for displaying file directory interface 900, a file selection control of file directory interface 900 (such as a representation of content in file directory interface 900) and/or an "open" control of file directory interface 900) for selecting an object 302 that corresponds to the identified uncompleted task component (e.g., 302*a*).

In some embodiments, the device detects (3020) input at the control for selecting the object that corresponds to the identified uncompleted task component (e.g., selectable object information 702*a*). In response to detecting the input at the control for selecting the object that corresponds to the identified uncompleted task component 302 (e.g., control 802 for displaying file directory interface 900, a file selection control of file directory interface 900 (such as a representation 910 of content in file directory interface 900) and/or an "open" control of file directory interface 900), the device adjusts a status of the identified uncompleted task component from an uncompleted status (e.g., "incomplete") to an intermediate-state status (e.g., "uploaded and unreviewed").

In some embodiments (3022), the second graphical user interface (e.g., task tracker interface 700) includes a control (e.g., control 1302 "Move to Archive") for adjusting a status of an intermediate-state task component from an intermediate-state status (e.g., "uploaded and unreviewed") to a completed status (e.g., as described with regard to FIG. 13). For example, when a task tracker interface 700 is displayed, an input, such as a right-click input, received at a location that corresponds to object information 702*a* (with object status "uploaded and unreviewed," as indicated by 704*a* in FIG. 13) causes a menu to be displayed. The menu includes control 1302 ("Move to Archive") for indicating that review of object content 308 of object 302*a* is complete. An input received at control 1302 (e.g., by releasing the right click while pointer icon 1308 is hovering over control 1302) causes the status of object 302*a* to chang from "uploaded and unreviewed" to "complete," as indicated by icon 704*a* in FIG. 14.

The device updates (3026) the first graphical user interface (e.g., dashboard GUI 400, task completion interface 402, and/or task completion projection interface 2400) using the changed status of the respective uncompleted task component. For example, when the status of object 302*a* changes from "uncompleted" to "uploaded and unreviewed," as described with regard to FIGS. 6-11, task completion control 502 of dashboard GUI 400 is updated to adjust a size of region 516 that indicates a number of objects 302 that have an object status 306 of "uploaded and unreviewed," and task completion control 502 is updated to adjust a size of region 518 that indicates a number of objects 302 with an object status 306 of "incomplete," as illustrated by the sizes of regions 516 and 518 in FIG. 6 and in FIG. 12.

In some embodiments, updating the first graphical user interface (e.g., dashboard GUI 400, task completion interface 402, and/or task completion projection interface 2400) using the changed status of the respective uncompleted task component includes (3028) altering the indicia that correspond to the at least one uncompleted task component of the first plurality of task components. For example, when the status of object 302*a* changes from "uncompleted" to "uploaded and unreviewed," as described with regard to FIGS. 6-11, task completion control 502 is updated to adjust a size of region 518 that indicates a number of objects 302 with an object status 306 of "incomplete," as illustrated by the sizes of region 518 in FIG. 6 and in FIG. 12.

In some embodiments, altering the indicia that correspond to the at least one uncompleted task component of the first plurality of task components includes (3030) at least one of: reducing (3030*a*) a size of indicia that correspond to the at least one uncompleted task component (e.g., reducing a size of region 518 of task completion control 502 that indicates a number of objects 302 with an object status 306 of "incomplete," as shown in FIG. 12), ceasing (3030*b*) to display the indicia that correspond to the at least one uncompleted task component, or altering (3030*c*) a representation of a rate of task completion.

In some embodiments, the first task completion control includes (3032) indicia that correspond to at least one intermediate-state task component (e.g., region 516 of task completion control 502 that indicates a number of objects 302 with an object status 306 of "uploaded and unreviewed").

In some embodiments, updating the first graphical user interface using the changed status of the respective uncompleted task component includes (3034) altering the indicia (e.g., region 516) that correspond to the at least one intermediate-state (e.g., "uploaded and unreviewed") task component of the first plurality of task components. In some embodiments, altering the indicia (e.g., region 516) that correspond to the at least one intermediate-state task component of the first plurality of task components includes (3036) increasing a size of the indicia that correspond to the at least one intermediate-state task component. For example, from FIG. 6 to FIG. 12, a width of region 516 of task completion control 502 (that indicates a number of objects 302 with an object status 306 of "uploaded and unreviewed") expands.

It will be recognized that the interactive project tracking interface described herein could be used for managing a variety of types of projects, such as document tracking for managing documents processed in a legal practice, healthcare practice, construction management, archiving service or other industry that has stringent record keeping requirements and/or involves review and/or collection of large quantities of documents or other content.

Features of the present invention can be implemented in, using, or with the assistance of a computer program product, such as a storage medium (media) or computer readable storage medium (media) having instructions stored thereon/in which can be used to program a processing system to perform any of the features presented herein. The storage medium (e.g., memory 104, 204) can include, but is not limited to, high-speed random access memory, such as DRAM, SRAM, DDR RAM or other random access solid state memory devices, and may include non-volatile memory, such as one or more magnetic disk storage devices, optical disk storage devices, flash memory devices, or other non-volatile solid state storage devices. Memory 104, 204 optionally includes one or more storage devices remotely located from the CPU(s) 130, 230. Memory 104, 204, or alternatively the non-volatile memory device(s) within memory 104, 204, comprises a non-transitory computer readable storage medium.

Stored on any one of the machine readable medium (media), features of the present invention can be incorporated in software and/or firmware for controlling the hardware of a processing system, and for enabling a processing system to interact with other mechanism utilizing the results of the present invention. Such software or firmware may include, but is not limited to, application code, device drivers, operating systems, and execution environments/containers.

Communication systems as referred to herein (e.g., communication system 134, 234) optionally communicate via wired and/or wireless communication connections. Communication systems optionally communicate with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. Wireless communication connections optionally use any of a plurality of communications standards, protocols and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Wireless Fidelity (Wi-Fi) (e.g., IEEE 102.11a, IEEE 102.11ac, IEEE 102.11ax, IEEE 102.11b, IEEE 102.11g and/or IEEE 102.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

It will be understood that, although the terms "first," "second," etc. may be used herein to describe various elements, these elements should not be limited by these terms. These terms are only used to distinguish one element from another.

The terminology used herein is for the purpose of describing particular embodiments only and is not intended to be limiting of the claims. As used in the description of the embodiments and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The foregoing description, for purpose of explanation, has been described with reference to specific embodiments. However, the illustrative discussions above are not intended to be exhaustive or to limit the claims to the precise forms disclosed. Many modifications and variations are possible in view of the above teachings. The embodiments were chosen and described in order to best explain principles of operation and practical applications, to thereby enable others skilled in the art.

What is claimed is:

1. A method for managing clinical trials, performed at a computing device that is communicatively connected with a server system, the computing device having a display, one or more processors and memory, the memory storing one or more programs configured for execution by the one or more processors, the method comprising:

retrieving, from a database of the server system, data corresponding to a project plan for a clinical trial, the project plan including a plurality of tasks, the plurality of tasks including a first task having a plurality of task components, wherein each of the task components identifies a respective one or more documents to be collected for completion of the respective task component;

retrieving, from a document repository of the server system, document metadata corresponding to documents for the clinical trial, the document metadata correlating each stored document with a respective task component of a respective task in the project plan;

in accordance with the retrieved document metadata, determining a respective status for each task component of the plurality of task components, wherein the respective status is complete when there are one or more respective documents, stored in the document repository, correlated with the respective task component;

displaying, in a graphical user interface, an interactive task completion control element corresponding to the first task, wherein:

the task completion control element has a width that includes a first portion and a second portion:
the first portion represents a number of task components that are completed;
the second portion represents a number of task components that are uncompleted; and
the first portion and the second portion are visually distinguished from each other in the task completion control element;
receiving a user interaction with the second portion of the task completion control element;
in response to the user interaction, displaying a document upload interface for a first task component in the second portion; and
in response to user selection of a first document shown in the document upload interface:
transmitting the first document from the computing device to the server system for storage in the document repository, including metadata correlating the first document with the first task component; and
updating the first and second portions of the width of the task completion control element to reflect updated numbers of task components that are completed and uncompleted.

2. A computer system for managing clinical trials, the system comprising:
a display;
one or more processors;
memory; and
one or more programs stored in the memory and are configured to be executed by the one or more processors, the one or more programs including instructions for:
retrieving, from a database of a server system that is communicatively connected with the computer system, data corresponding to a project plan for a clinical trial, the project plan including a plurality of tasks, the plurality of tasks including a first task having a plurality of task components, wherein each of the task components identifies a respective one or more documents to be collected for completion of the respective task component;
retrieving, from a document repository of the server system, document metadata corresponding to documents for the clinical trial, the document metadata correlating each stored document with a respective task component of a respective task in the project plan;
in accordance with the retrieved document metadata, determining a respective status for each task component of the plurality of task components, wherein the respective status is complete when there are one or more respective documents, stored in the document repository, correlated with the respective task component;
displaying, in a graphical user interface, an interactive task completion control element corresponding to the first task, wherein:
the task completion control element has a width that includes a first portion and a second portion:
the first portion represents a number of task components that are completed;
the second portion represents a number of task components that are uncompleted; and
the first portion and the second portion are visually distinguished from each other in the task completion control element;
receiving a user interaction with the second portion of the task completion control element;
in response to the user interaction, displaying a document upload interface for a first task component in the second portion; and
in response to user selection of a first document shown in the document upload interface:
transmitting the first document from the computer system to the server system for storage in the document repository, including metadata correlating the first document with the first task component; and
updating the first and second portions of the width of the task completion control element to reflect updated numbers of task components that are completed and uncompleted.

3. A non-transitory computer readable storage medium storing one or more programs configured for execution by one or more processors of a computing system having a display, the one or more programs comprising instructions for:
retrieving, from a database of a server system that is communicatively connected with the computer system, data corresponding to a project plan for a clinical trial, the project plan including a plurality of tasks, the plurality of tasks including a first task having a plurality of task components, wherein each of the task components identifies a respective one or more documents to be collected for completion of the respective task component;
retrieving, from a document repository of the server system, document metadata corresponding to documents for the clinical trial, the document metadata correlating each stored document with a respective task component of a respective task in the project plan;
in accordance with the retrieved document metadata, determining a respective status for each task component of the plurality of task components, wherein the respective status is complete when there are one or more respective documents, stored in the document repository, correlated with the respective task component;
displaying, in a graphical user interface, an interactive task completion control element corresponding to the first task, wherein:
the task completion control element has a width that includes a first portion and a second portion:
the first portion represents a number of task components that are completed;
the second portion represents a number of task components that are uncompleted; and
the first portion and the second portion are visually distinguished from each other in the task completion control element;
receiving a user interaction with the second portion of the task completion control element;
in response to the user interaction, displaying a document upload interface for a first task component in the second portion; and
in response to user selection of a first document shown in the document upload interface:
transmitting the first document from the computing device to the server system for storage in the document repository, including metadata correlating the first document with the first task component; and updating the first and second portions of the width of the task completion control element to reflect updated numbers of task components that are completed and uncompleted.

4. The method of claim 1, further comprising:
prior to displaying the interactive task completion control element:
determining a time range for the first task based on a number of task components to be completed for the first task and productivity information of users assigned to the first task.

5. The method of claim 4, wherein the width of the task completion control element is proportional to the time range for the first task.

6. The method of claim 1, wherein the document upload interface is overlaid over the graphical user interface.

7. The method of claim 1, further comprising:
displaying, concurrently with the interactive task completion control element, a task status indicator that identifies a total number of task components to be completed for the first task and a number of task components that are completed.

8. The method of claim 7, wherein the task status indicator is displayed as a fractional value.

9. The method of claim 1, further comprising:
determining a projected non-linear rate of progress for the first task based on productivity information of users assigned to the first task, wherein the projected non-linear rate of progress takes into account one or more days during which work corresponding to the first task does not occur and/or is accelerated.

10. The computer system of claim 2, wherein the one or more programs further include instructions for:
prior to displaying the interactive task completion control element:
determining a time range for the first task based on a number of task components to be completed for the first task and productivity information of users assigned to the first task.

11. The computer system of claim 10, wherein the width of the task completion control element is proportional to the time range for the first task.

12. The computer system of claim 2, wherein the document upload interface is overlaid over the graphical user interface.

13. The computer system of claim 2, wherein the one or more programs further include instructions for:
displaying, concurrently with the interactive task completion control element, a task status indicator that identifies a total number of task components to be completed for the first task and a number of task components that are completed.

14. The computer system of claim 13, wherein the task status indicator is displayed as a fractional value.

15. The computer system of claim 2, wherein the one or more programs further include instructions for:
determining a projected non-linear rate of progress for the first task based on productivity information of users assigned to the first task, wherein the projected non-linear rate of progress takes into account one or more days during which work corresponding to the first task does not occur and/or is accelerated.

16. The non-transitory computer readable storage medium of claim 3, wherein the one or more programs further comprise instructions for:
prior to displaying the interactive task completion control element:
determining a time range for the first task based on a number of task components to be completed for the first task and productivity information of users assigned to the first task.

17. The non-transitory computer readable storage medium of claim 16, wherein the width of the task completion control element is proportional to the time range for the first task.

18. The non-transitory computer readable storage medium of claim 3, wherein the document upload interface is overlaid over the graphical user interface.

19. The non-transitory computer readable storage medium of claim 3, wherein the one or more programs further comprise instructions for:
displaying, concurrently with the interactive task completion control element, a task status indicator that identifies a total number of task components to be completed for the first task and a number of task components that are completed.

20. The non-transitory computer readable storage medium of claim 3, wherein the one or more programs further comprise instructions for:
determining a projected non-linear rate of progress for the first task based on productivity information of users assigned to the first task, wherein the projected non-linear rate of progress takes into account one or more days during which work corresponding to the first task does not occur and/or is accelerated.

* * * * *